US010769639B2

(12) United States Patent  
King et al.

(10) Patent No.: US 10,769,639 B2  
(45) Date of Patent: *Sep. 8, 2020

(54) CLIENT RELATIONSHIP MANAGEMENT SYSTEM FOR MULTIPLE INDEPENDENT PARTIES

(71) Applicant: Client 4 Life Group, LLC., Richardson, TX (US)

(72) Inventors: Korbin King, Dallas, TX (US); Amber Hawkins, Princeton, TX (US); Alex Reed, Lewisville, TX (US)

(73) Assignee: Client 4 Life Group, LLC., Richardson, TX (US)

( * ) Notice: Subject to any disclaimer, the term of this patent is extended or adjusted under 35 U.S.C. 154(b) by 205 days.

This patent is subject to a terminal disclaimer.

(21) Appl. No.: 16/058,454

(22) Filed: Aug. 8, 2018

(65) Prior Publication Data

US 2020/0051090 A1 Feb. 13, 2020

(51) Int. Cl.
*G06Q 30/00* (2012.01)
*G06Q 10/10* (2012.01)
*G06F 16/903* (2019.01)

(52) U.S. Cl.
CPC .......... *G06Q 30/01* (2013.01); *G06F 16/903* (2019.01); *G06Q 10/1095* (2013.01)

(58) Field of Classification Search
None
See application file for complete search history.

(56) References Cited

U.S. PATENT DOCUMENTS

| | | | | |
|---|---|---|---|---|
| 5,826,240 | A * | 10/1998 | Brockman | G06Q 10/06311 705/7.15 |
| 5,878,423 | A * | 3/1999 | Anderson | G06F 16/907 |
| 7,467,135 | B2 * | 12/2008 | Coker | G06Q 30/02 |
| 10,235,628 | B1 * | 3/2019 | Merritt | H04M 3/4365 |
| 10,257,355 | B1 * | 4/2019 | Merritt | G06N 20/20 |
| 2002/0059283 | A1 * | 5/2002 | Shapiro | G06Q 30/02 |

(Continued)

OTHER PUBLICATIONS

Financial Services Cloud: Asset Management Software & More, "https://www.salesforce.com/products/financial-services-cloud/overview/?d=7010M000001y80C", 2018.

(Continued)

*Primary Examiner* — Leland Marcus  
(74) *Attorney, Agent, or Firm* — Fleit Intellectual Property Law; Jon Gibbons

(57) ABSTRACT

A novel system and process for managing multiple parties in a client relationship process is described. The system manages three independent parties including a client, an account manager, and an advisor. Records are retrieved from a file for a group of all clients that are part of the client relationship process. The records are displayed as user interface widgets that indicate status of client relationship for the group. Based on time periods expiring combined with no other contacts to a client having been made, a client relationship campaign of advisor, client being in a pre-defined tier, and client not being part of an active sales campaign, a script is retrieved for use during a follow-up communication. Account manager uses script to contact client. Answers received are stored into record in database associated with client in a hierarchical tree structure. Alerts, follow-up actions, and updating of user interface widgets are triggered.

20 Claims, 32 Drawing Sheets

(56) References Cited

U.S. PATENT DOCUMENTS

| | | | | |
|---|---|---|---|---|
| 2004/0102996 | A1* | 5/2004 | Boppana | G06Q 99/00 |
| | | | | 705/500 |
| 2005/0273384 | A1* | 12/2005 | Fraser | G06Q 30/0241 |
| | | | | 705/14.41 |
| 2016/0173693 | A1* | 6/2016 | Spievak | H04M 3/42042 |
| | | | | 379/265.09 |

OTHER PUBLICATIONS

Sycamore Company, "Client Management Software for Financial Services", http://www.sycamorecompany.com/client-manager-3/ 2017.
AppCrown, World Class RIA CRM & Broker Dealer Automation, "http://appcrown.com/" 2018.

* cited by examiner

| Home | Accounts | Documents | Dashboards | Reports | Investors | Contacts | C4L App | + |

C4L DIRECTIVE-BASED DASHBOARD    C4L PROGRAM RESULTS DASHBOARD

C4L DIRECTIVE-BASED DASHBOARD

Return to C4L App

Filter Dashboard as Jeff Nicholas ▼

702 - Practice Management

| Practice Management | |
|---|---|
| Tasks to Complete: | 8 |
| Potential RMDs: | 2 |
| Qualifying Events: | 7 |
| Accounts Out of Surrender: | 19 |
| Pending Accounts: | 0 |

704 - Sales Pipeline Management

| Sales Pipeline Management | |
|---|---|
| Appt Prep to Complete: | 1 |
| Advisor Updates to Complete | 6 |
| Campaign Stalls- Unable to Call: | 0 |
| Opportunities Due: | 5 |

706 - Trusted Advisor Program

| Trusted Advisor Program | |
|---|---|
| Email Campaigns to Send: | 5 |
| Birthday Letters to Print: | 0 |
| Birthday Emails to Send: | 2 |
| Anniversary Letters to Print: | 0 |
| Anniversary Emails to Send: | 1 |
| Client Reviews Due | 171 |
| Checkup Calls Due: | 179 |
| Clients Missing Birthdate | 129 |
| Clients Missing Wedding Anniversary | 2 |
| Clients Missing Email | 270 |

FIG. 7A

| | C4L Directive-Based Dashboard × | |
|---|---|---|
| ← → ⟳ | https://c.na59.visual.force.com/apex/C4LDirectiveDashboard?id=a2Rf40000002pzkEAA | |

| | | |
|---|---|---|
| Client Reviews Due: | | 171 |
| Checkup Calls Due: | | 179 |
| Clients Missing Birthdate | | 129 |
| Clients Missing Wedding Anniversary | | 2 |
| Clients Missing Email | | 270 |

808

🗓 Client Reviews Due

| < = Next 30 Days ▼ | 804 |
|---|---|

All
Today and Overdue
Today Only
Next 120 Days
Next 60 Days
Next 30 Days
Next 7 Days
< = Next 60 Days
< = Next 30 Days
< = Next 7 Days
Next 3 Months
Next 2 Months Search: [       ]

| Rating | Last Review | Last Date Offered | Next Review | Last Contacted | Phone | Trusted Advisor Override Options | Owner |
|---|---|---|---|---|---|---|---|
| 2 | 6/20/2018 | 6/20/2018 | 6/20/2019 | 6/20/2018 | (806) 577-4893 | | Jeff Nicholas |
| 2 | 5/11/2018 | | 5/11/2019 | 5/11/2018 | (214) 495-0816 | | Jeff Nicholas |
| 2 | 6/20/2018 | 6/20/2018 | 6/20/2019 | 6/20/2018 | (806) 535-4121 | | Jeff Nicholas |
| 2 | 6/20/2018 | 6/20/2018 | 6/20/2019 | 6/20/2018 | | | Jeff Nicholas |
| 2 | 6/20/2018 | 6/20/2018 | 6/20/2019 | 6/20/2018 | (806) 782-6190 | | Jeff Nicholas |
| 2 | 6/20/2018 | 6/20/2018 | 6/20/2019 | 6/20/2018 | (512) 218-4293 | | Jeff Nicholas |
| 2 | 9/1/2015 | | 8/31/2016 | 9/1/2015 | (806) 773-8398 | | Jeff Nicholas |
| 2 | 6/20/2018 | 6/20/2018 | 6/20/2019 | 6/20/2018 | (806) 346-7330 | | Jeff Nicholas |
| 2 | 6/20/2018 | 6/20/2018 | 6/20/2019 | 6/20/2018 | (214) 418-2960 | | Jeff Nicholas |
| 2 | 6/20/2018 | 6/20/2018 | 6/20/2019 | 6/20/2018 | (817) 733-9020 | | Jeff Nicholas |

Save   Export to Excel   806

Showing record(s) 1-10 out of 689

10 ▼   802

≪ First   < Previous   1 2 3 4 5 6 7 ...   Next >   Last ≫

C4L DIRECTIVE-BASED DASHBOARD

Return to C4L App

| Practice Management | |
|---|---|
| Tasks to Complete: | 8 |
| Potential RMDs: | 2 |
| Qualifying Events: | 7 |
| Accounts Out of Surrender: | 19 |
| Pending Accounts: | 0 |

| Sales Pipeline Management | |
|---|---|
| Appt Prep to Complete: | 1 |
| Advisor Updates to Complete: | 6 |
| Campaign Stalls- Unable to Call: | 0 |
| Opportunities Due: | 5 |

820 — Filter Dashboard as: Jeff Nicholas ▼
  Alex Reed Voya
  Chris Kennedy
  Jeff Nicholas

| Trusted Advisor Program | |
|---|---|
| Email Campaigns to Send: | |
| Birthday Letters to Print: | |
| Birthday Emails to Send: | 2 |
| Anniversary Letters to Print: | 0 |
| Anniversary Emails to Send: | 1 |
| Client Reviews Due | 171 |
| Checkup Calls Due: | 179 |
| Clients Missing Birthdate | 129 |
| Clients Missing Wedding Anniversary | 2 |
| Clients Missing Email | 270 |

822

824 — Birthday Emails to Send
Today Only ▷

Save | Export to Excel | Send Default Emails | Go To Mail Merge Page

Search:

| Name | Birthday | Age | Mailing Street | Email | Rating | Last Bday Message Sent | Owner |
|---|---|---|---|---|---|---|---|
| ☐ Jerry Barker | 7/20/1958 | 60.00 | | | 2 | | Jeff Nicholas |

Target
Name: Mr. Brady
Type: Prospect
Clients Current Time:

Reciprocal
Name: TEST-Brenda Brady
Type: Client
Additional Decision Maker: No

Campaign
Name: Referral - Bilal Aquil
Source: Seminar

Scheduling Information
Time Needed to Prepare for Appt:
Appointment Location Options: in office or by telephone
Advisor Appt Preferences:
Interests:
Additional Call Details: test Request Info Details - 7/13/2018 9:43 AM Request Info Details - 7/13/2018 9:43 AM Quick Links
Advisor Calendar
Last AM Note
Directions to Office from Primary Address
Campaign Dossier Advisor Information
Name:
Company Name:
In Office Location: Primary Office
In Office Address:
In Office Rules:
Email:
Phone:
Website:

Advisor Assistant Info
Assistant Name:
Assistant Phone: ⌐902
Assistant Email:

Voicemail Message

Mr. Brady, this is Amber Hawkins with xxxx's office at xxxx Financial. We're the firm that helps individuals with retirement planning, college funding, and financial services. Recently, we were talking with Jerry who gave us your name as someone who potentially could be a good fit with the way we do business. Xxxx has enjoyed working with Jerry. My number is XXX-XXX-XXXX. Please give me a call. Again my number is XXX-XXX-XXXX. Thank you. Good bye

Introduction

May I speak with Mr. Brady please?

Mr. Brady, this is Amber Hawkins with xxxx's office at xxxx Financial. Does either xxxx Financial or xxxx ring a bell?

(RESPONSE)

We're the firm that helps individuals with retirement planning, college funding, and financial services. Recently, we were talking with Jerry who gave us your name as someone who potentially could be a good fit with the way we do business. Xxxx has enjoyed working with Jerry.

*Did Not Reach Respondent

[ --None-- ▽ ]

*Script Override

[ --None-- ▽ ] ⟵ 904

FIG. 9B continued from FIG. 9A (3)

continued from FIG. 9A (3)

The Offer

What Bilal does is simple. He looks at your complete financial situation, helps determine what matters to you most financially, and puts an action plan in place to help you achieve your goals and dreams. Does that sound like something you would be interested in discussing with Bilal?

(RESPONSE)

*Interested in Offer?
● Yes
○ No
○ Hesitant to Answer Any Questions
○ Asks: "How do you do that?/What do you mean?"

Notes

*Script Override

--None--

FIG. 9C

Interest

Before I get you on Bilal's calendar, let me ask you a few more questions. Do you have a couple of minutes?

(RESPONSE)
*Able to Visit Now?
● Yes
○ No
○ Hesitant to Answer Any Questions

Notes

*Script Override
--None--

FIG. 9D

The Offer

What Bilal does is simple. He looks at your complete financial situation, helps determine what matters to you most financially, and puts an action plan in place to help you achieve your goals and dreams. Does that sound like something you would be interested in discussing with Bilal?

(RESPONSE)

*Interested in Offer?
○ Yes
● No
○ Hesitant to Answer Any Questions
○ Asks: "How do you do that?/What do you mean?"

Notes

*Script Override

--None--

FIG. 9E

No Interest

Okay, I will note that you are not interested in our offer today.

*Communication Okay?

◉ Yes
○ No

Notes

*Script Override

--None--

FIG. 9F

Voicemail Message

Hi «PotentialBuyerNickName», this is «AMFullName» from «AdvisorFullName»'s office at «Company Name». We're the firm that helps individuals with «AdvisorServices». My number is «AMPhoneNumber». Please give me a call. Again, my number is «AMPhoneNumber». Thank you. Goodbye.

Section A1: Introduction

May I speak with «PotentialBuyerNickName», please? (RESPONSE)

«PotentialBuyerNickName», this is «AMFullName» from «AdvisorFullName»'s office at «Company Name». Does either «Company Name» or «AdvisorFullName» sound familiar? (RESPONSE)

<u>Yes or No:</u> We're the firm that helps individuals with «AdvisorServices». You know of «AdvisorFullName» from a «Lead Source».) <u>(Go to Section A2: The Offer)</u>

Section A2: The Offer

«AdvisorFirstName» would like to discuss the options available to you regarding «GenericOfferShortDescription». Does that sound like something you would be <u>interested</u> in discussing with «AdvisorFirstName»? (RESPONSE) (Go to Section A3: Interest)

Section A3: Interest?

<u>A3.1 Yes:</u> (Go to Section B1: Time?)

<u>A3.2 Hesitant:</u> Would you be willing to receive more information about «GenericOfferShortDescription»? (RESPONSE)

FIG. 10A

A3.2a Yes = Call Back: *Okay, we will send you some information today. You should receive the information over the next couple of weeks. We will follow up with you then. May I confirm your best email address? (RESPONSE) Okay, we really appreciate your time today. If you have any questions about «CompanyName», please call «CompanyPhoneNumber». Thank you. Goodbye.*

A3.2b.2 No = Not Interested: *Okay, I will note that you are not interested in our offer today. If you have any questions about «CompanyName», please call «CompanyPhoneNumber». Thank you. Goodbye.*

A3.3 No = Not Interested: *Okay, I will note that you are not interested in our offer today. If you have any questions about «CompanyName», please call «CompanyPhoneNumber». Thank you. Goodbye.*

Section B1: Time?

*Okay, great. I know you do not know all the details right now, but assuming you like the options «AdvisorFirstName» will present to you, would you be able to make a decision on moving forward <u>in the next month or so?</u> (RESPONSE)*

B4.1 Yes: *«PotentialBuyerNickName», I think it would be an excellent idea if you met with «AdvisorFirstName». The meeting can be done in «AdvisorMeetingLocationPreferences» (e.g. in office, by telephone or at a location convenient to you). (Display Advisor Profile Meeting Location Options.) How does that sound to you? (RESPONSE)*

*I have a spot on «AdvisorFirstName»'s calendar for «Date» at «Time» or «Date» at «Time». What date/time works for you? (RESPONSE)*

FIG. 10B

B4.1a Yes, Ready to Meet = Schedule In-Office or Telephone or Out-Office Appt: *Great! «PotentialBuyerNickName», I have you on «AdvisorFirstName»'s calendar for «Date» and «Time» at «Location» for «Purpose». We will email an appointment confirmation to you. May I confirm your best email address? (RESPONSE) May I confirm your best phone number? (RESPONSE) May I confirm the best time of day to contact you? (RESPONSE) I have your mailing address down as .... (RESPONSE) Is that also your physical address? (RESPONSE) You are all set! If you have any questions about «CompanyName», please call «CompanyPhoneNumber». Have a good day and thank you.*

B4.1b No, NOT Ready to Meet: *Okay, it doesn't seem like you are ready to meet with «AdvisorFirstName» at this time. Could we send you some information on «GenericOfferShortDescription»? (RESPONSE)*

B4.1b.1 Yes = Call back: *Okay, we will send you some information today. Once you receive this information, please look it over and note any questions you may have. We will call you in a week or so to discuss. May I confirm your best email address? (RESPONSE) May I confirm your best phone number? (RESPONSE) May I confirm the best time of day to contact you? (RESPONSE) Great! We will send you that information and will follow up with you soon. If you have any questions about «CompanyName», please call «CompanyPhoneNumber». Okay, thank you. Goodbye.*

B4.1b.2 No = Not Interested: *Okay, I will note that you are not interested in our offer today. If you have any questions about «CompanyName», please call «CompanyPhoneNumber». Thank you. Goodbye.*

B4.2 No, Cannot make a decision in the next month: *OK, let me ask you this. Is there a time in the future when you would better be able to sit down with «AdvisorFirstName» to discuss «GenericOfferShortDescription»? (RESPONSE)*

FIG. 10C

B4.2a Yes = Call back: Establish Follow-up Date, Best Time to Call, and Misc. Call Notes.
*Okay, great. We will give you a call on «FOLLOW-UP DATE» and we'll set a time then to take a closer look. May I confirm your best email address? (RESPONSE) May I confirm your best phone number? (RESPONSE) Great! We will be in touch on «FOLLOW-UP DATE». If you need anything before then or if you have any questions about «Company Name», please call «CompanyPhoneNumber». Thank you. Goodbye.*

B4.2b No = Not Interested: *Okay, I will note that you are not interested in our offer today. If you have any questions about «Company Name», please call «CompanyPhoneNumber». Thank you. Goodbye.*

FIG. 10D

```xml
//Call 1-4 Flow
<decisions>
//Check if campaign uses call 1-4 tracks or if contact has already been called today
    <name>Campaign_Type_Correct</name>
    <label>Campaign Type Correct</label>
    <locationX>629</locationX>
    <locationY>1656</locationY>
    <defaultConnectorLabel>[Default Outcome]</defaultConnectorLabel>
    <rules>
      <name>Already_Called_Today</name>
      <conditionLogic>and</conditionLogic>
      <conditions>
        <leftValueReference>CampaignMember.C4L__Custom_2_Date__c</leftValueReference>
        <operator>EqualTo</operator>
        <rightValue>
          <elementReference>$Flow.CurrentDate</elementReference>
        </rightValue>
      </conditions>
      <label>Already Called Today?</label>
    </rules>
    <rules>
      <name>Reached_Calls</name>
      <conditionLogic>and</conditionLogic>
      <conditions>
        <leftValueReference>ReachedNumberOfCalls</leftValueReference>
        <operator>EqualTo</operator>
        <rightValue>
          <booleanValue>true</booleanValue>
        </rightValue>
      </conditions>
      <conditions>
        <leftValueReference>CampaignMember.C4L__Track__c</leftValueReference>
        <operator>NotEqualTo</operator>
        <rightValue>
          <stringValue>Ready For Call 1</stringValue>
        </rightValue>
      </conditions>
      <conditions>
        <leftValueReference>CampaignMember.C4L__Track__c</leftValueReference>
        <operator>NotEqualTo</operator>
        <rightValue>
```

FIG. 11

CLIENT RELATIONSHIP MANAGEMENT SYSTEM FOR MULTIPLE INDEPENDENT PARTIES

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

FIELD OF THE INVENTION

This invention relates generally to computerized client management systems. Specifically, it relates to methods and systems and computer program products for managing client and practice management needs.

BACKGROUND OF THE INVENTION

While client systems exist for managing the operational and investment needs of independent financial advisors, few, if any, alternatives are available to effectively manage the combination of client acquisition, client service, and client retention.

Further, there are many different client relationship management (CRM) options like Redtail, Junxure, and more. Each of these CRM options provide their own set of features and benefits; however, they all have one clear shortcoming. The database is only as beneficial as the amount of time and energy a user puts into using it. No matter how many great features a CRM offers, they are meaningless without someone to spend the time learning and operating them appropriately. A study done by Forrester and CustomerThink found that nearly 40% of CRM users lacked the knowledge, skillset, training, people, and clearly defined objectives when attempting to use a CRM, essentially eliminating most of the benefit a CRM should provide.

Accordingly, a need exists to help the advisor's team run their CRM to reach its maximum benefits while freeing up the advisor's team to focus on selling and running their day-to-day operation.

SUMMARY OF THE INVENTION

The present invention provides a novel management system to meet the client and practice management needs. The management system helps advisors run their CRM to reach its maximum benefits, while freeing up the advisor's team to focus on selling and running their day-to-day operation. The advisor's calendar is filled with qualified appointments. With an increase in production, the advisor realizes an increase in overall revenue. This system improves client communication, increases client loyalty, and reduces client attrition.

Although this management system has proven especially useful in assisting the independent financial advisor industry, it is not limited to the financial advisor industry. Rather, the present invention is applicable to any industry in which multiple parties are used to manage a sales process or a client relationship process.

A combination of state-of-the-art technology, process, and support staff are deployed to drive an advisor's practice to effectively manage client acquisition, client service, and client retention.

In one example, a novel system and process for managing multiple parties in a sales process for a good or service is described. The system manages three independent parties including a potential buyer, an account manager, and an advisor. A client attribute of whether the potential buyer does not have knowledge of the advisor and has not previously bought a good or service (lead), or has knowledge of the advisor but has not previously bought a good or service from the advisor (prospect), or is already a purchaser of the advisor's goods or services offered but is now in consideration of buying a subsequent good or service from the advisor (client), or is no longer interested in an ongoing relationship with the advisor (purge) combined with a customizable sales campaign, is used to select a first script for use by the account manager to qualify the potential buyer. Answers received are stored into the record in the database associated with the potential buyer in a hierarchical tree structure and used to classify the potential buyer into categories that define how ready the potential buyer is to make a purchase. A second script is retrieved and displayed based on the sales campaign, the categorization of the potential buyer, the expiration of one or more time periods, and an assigned call back priority. During a subsequent communication, the account manager uses the second script to contact and schedule a meeting with the potential buyer. The answers received from the potential buyer are stored into the record in the database associated with the client using the hierarchical tree structure that summarizes answers in a predefined format.

In another example, a novel system and process for managing multiple parties in a client relationship process is described. The system manages three independent parties including a client, an account manager, and an advisor. Based on 1) a client attribute of whether the third party is a client, 2) one of three pre-defined tiers of the client, 3) a time period expiring combined with no other previous successful contacts made with the client during that time period, and 4) a customizable client relationship campaign, a script is retrieved and used during a telephonic communication with the client carried out by an account manager. The answers received are stored into the record in the database associated with the client in a hierarchical tree structure and used to determine if there are follow-up alerts and actions for which the advisor should be notified in order to improve client communication, increase client loyalty, and reduce client attrition. Records are retrieved from a file for a group of all clients that are part of the client relationship process. The records are displayed as user interface widgets that indicate the status of the client relationship for the group. Alerts, follow-up actions, and the updating of the user interface widgets are triggered based on the script.

In still another example, a novel system and process for managing multiple parties in a client review process is described. The system manages three independent parties including a client, an account manager, and an advisor. A client attribute of whether the third party is a client combined with 1) a customizable client review campaign, 2) a time period expiring, 3) establishing that the client is not part of an active sales campaign governed by the advisor, and 4) one of three predefined tiers of the client, a first script is used during an initial telephonic communication carried out by an account manager to schedule a client review meeting between the client and the advisor. The answers received are stored into the record in the database associated with the client in a hierarchical tree structure that summarizes answers in a predefined format. Based on the answers received, the client is classified into one of at least three categories wherein each of the categories represents a probability that the client is ready to schedule a client review meeting. A second script is retrieved and displayed based on the client review campaign, the categorization of the client, the expiration of one or more time periods, and an assigned call back priority. During a subsequent communication, the account manager uses the second script to schedule a client review meeting between the client and the advisor. The answers received from the client are stored into the record in the database associated with the client using the hierarchical tree structure that summarizes answers in a predefined format.

The customization and preferences for each of the scripts are provided by the advisor for each of the sales campaign, the client relationship campaign, and the client review campaign. The preferences include script variables, contact variables, meeting variables, and message variables. The preferences provided by the advisor include a frequency of call attempts, a number of days in between contact attempts, and four telephone call attempts to be scheduled as a default as two separate telephone calls during different afternoon time periods, one call in a morning time period, and one call in an evening time period.

The preferences provided by the advisor can include the type of script associated with the corresponding client attribute indicating whether the client is a lead, prospect, client, or purge regarding the offer of the sales campaign, the advisor's contact information, and specific language to be used in the script, with the possibility of removing certain script questions and language.

The processes above can further comprise receiving after a meeting from the advisor, one or more of audio information, short messaging service (SMS) information, email information, and user input, which is prompted through a user interface utilizing a pre-defined template to document the meeting into a hierarchical tree structure as part of the record in the database. The account manager can edit the record in the database in accordance with the pre-defined template. The advisor can provide directives, including scheduling at least one of appointments, tasks to be carried out by the advisor, tasks to be carried out by the account manager, messages to be sent to the client, updating at least one of the category used for the client, the client attribute, or a combination thereof, adding any potential opportunities to purchase a good or service at a future point in time, or a combination thereof.

The process above can further include retrieving from the database a series of records for a group of all prospective third parties including those who are part of one or more of the sales campaign, the client relationship campaign, and the client review campaign. Multiple graphical user interface widgets are displayed indicating status of the sales campaign, the client relationship campaign, and the client review campaign for the group of all third parties.

The scripts can be encoded in a markup language. The scripts may include contents for recording a voice mail left at a telephone number of the client; the contents are based on the preferences set by the advisor. The voice mail may be generated using text to speech.

Further, the script may include contents for automatically sending at least one of an email and text to the client; the contents are based on the preferences set by the advisor.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention will be apparent from the following detailed description, taken in conjunction with the accompanying drawings in which:

FIG. 7A to FIG. 7B are screen shots of the advisor's directive-based and program results dashboards of the management system;

FIG. 8A to FIG. 8D are screen shots of the advisor's dashboards of the management system meant to illustrate various customizations, filters, and features for efficiency in utilizing the dashboards;

FIG. 9A to FIG. 9F are screen shots of the script flow integrated into the management system;

FIG. 10A to FIG. 10D is an example script used by the account manager as presented by the management system in FIG. 9A through FIG. 9F;

FIG. 11 is a code fragment of the markup language used to implement the customized, integrated scripts shown in FIG. 9A through FIG. 9F and FIG. 10A to FIG. 10D of the management system;

DESCRIPTION OF THE PREFERRED EMBODIMENTS

Figure 1:
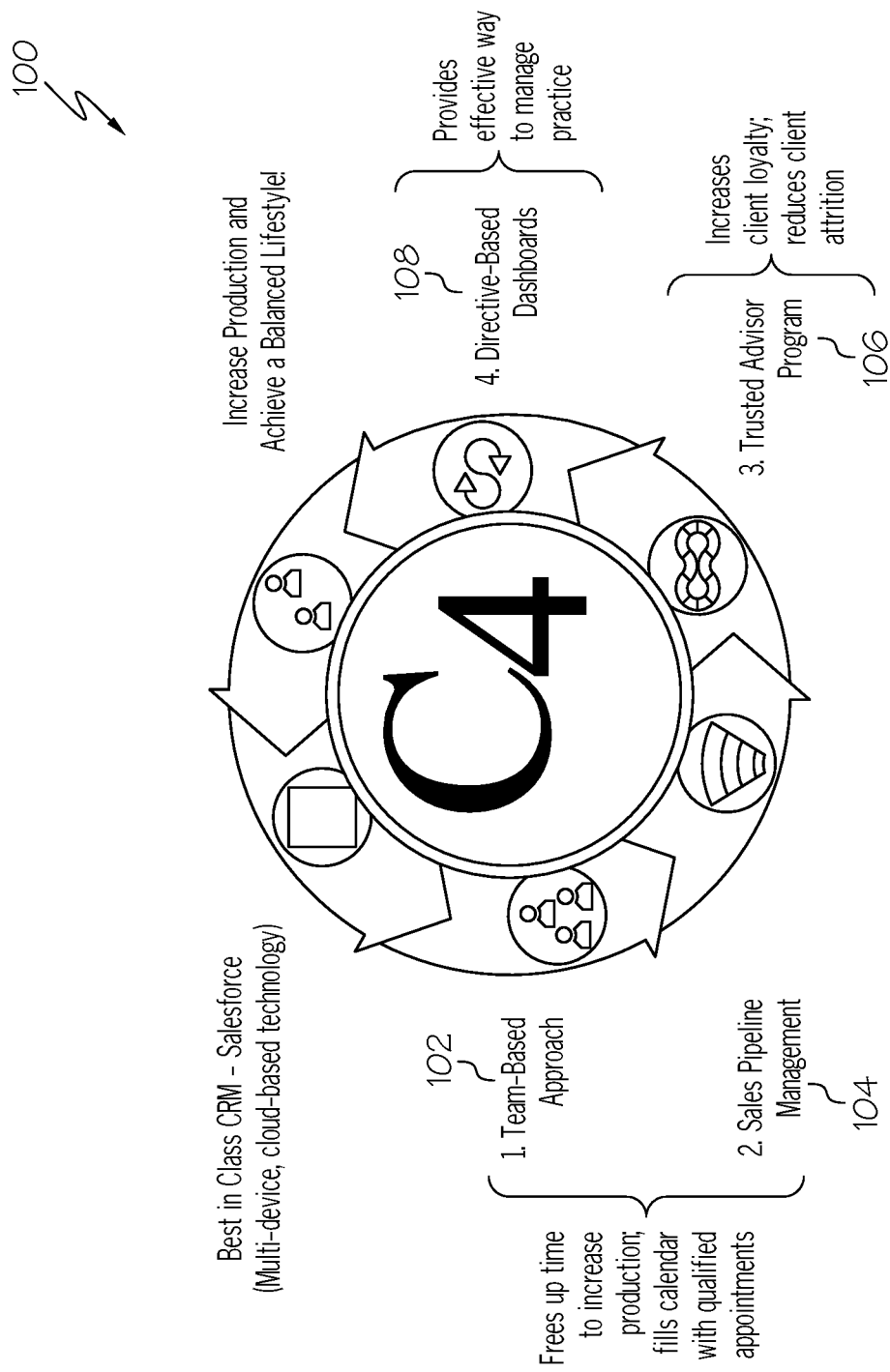
FIG. 1 is a diagram illustrating the major functions of the management system.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Further, the terms and phrases used herein are not intended to be limiting; but rather, to provide an understandable description of the invention.

The present invention deploys a combination of state-of-the-art technology, process, and support staff to drive an advisor's practice to effectively manage client acquisition, client service, and client retention.

The present invention provides a novel management system to meet the client and practice management needs. The management system helps advisors run their CRM to reach its maximum benefits, while freeing up the advisor to focus on selling and running their day-to-day operation. The advisor's calendar is filled with qualified appointments. With an increase in production, the advisor realizes an increase in overall revenue. This system improves client communication, increases client loyalty, and reduces client attrition.

Non-Limiting Definitions

The terms "a", "an" and "the" preceding an element or component are intended to include the plural forms as well, unless the context clearly indicates otherwise.

"Account Manage" abbreviated "AM" is a person or company working with a specified advisor using the client management system, utilizing custom, advisor approved scripts to qualify and classify potential buyers and clients by communicating directly with them in order to manage client acquisition, client service, and client retention. The account manager is referred to as the "second party" which is a different entity from the advisor (the first party) and the potential buyer (the third party) and the client (also the third party).

"Advisor" is a person or company that provides advice to clients and potential buyers in a specific field. For example, a financial advisor provides advice to individuals and families on estate planning, financial planning, and retirement planning. The advisor is referred to as the "first party" which is a different entity from the account manager (the second party) and the advisor support coordinator (also the second party) and the potential buyer (the third party) and the client (also the third party).

"Advisor Support Coordinator" abbreviated "ASC" is a person or company working with a specified advisor using the client management system to set up, execute, and monitor sales campaigns, coordinate tasks, and manage the priorities of the advisor. The ASC can be the same person or person as the AM or independent of the AM. The advisor support coordinator is referred to as the "second party" which is a different entity from the advisor (the first party) and the potential buyer (the third party) and the client (also the third party).

"Client" is a person or organization that has a current business relationship with an advisor and has previously purchased a good or service and could potentially purchase a subsequent good or service from the advisor. The client is referred to as the "third party" which is a different entity from the advisor (the first party) and the account manager (the second party) and the advisor support coordinator (also the second party).

"Lead" is a person or organization that has no knowledge of or business relationship with an advisor and has not previously purchased a good or service from the advisor. This is contrasted with the term "Prospect" in which the person or organization has knowledge of or a current business relationship with an advisor but has not previously purchased a good or service from the advisor. The lead is referred to as the "third party" which is a different entity from the advisor (the first party) and the account manager (the second party) and the advisor support coordinator (also the second party).

"Potential Buyer" abbreviated "PB" is a person or organization in consideration of purchasing a product from an advisor. The potential buyer is referred to as the "third party" which is a different entity from the advisor (the first party) and the account manager (the second party) and the advisor support coordinator (also the second party).

"Prospect" is a person or organization that has knowledge of or a current business relationship with an advisor but has not previously purchased a good or service from the advisor. This is contrasted with the term "Lead" in which the person or organization has no knowledge of or business relationship with an advisor and has not previously purchased a good or service from the advisor. The prospect is referred to as the "third party" which is a different entity from the advisor (the first party) and the account manager (the second party) and the advisor support coordinator (also the second party).

"Purge" is a person or organization that does not wish to maintain an ongoing relationship with an advisor. The purge is referred to as the "third party" which is a different entity from the advisor (the first party) and the account manager (the second party) and the advisor support coordinator (also the second party).

"Sales Campaign" is a series of systemized steps and actions to facilitate and track a planned sales strategy using one or more communication channels of phone, email, letters, and in-person meetings to contact, reach, and sell clients and potential buyers a good or service or combination thereof.

Functional Overview of Management System

FIG. 1 is a diagram illustrating the major functions of the management system. One example of the management system that has been deployed by the inventors is known as the Client 4 Life ("C4L") Management System 100 available from the Client 4 Life Group, LLC in Richardson Tex., USA. In one example, the management system is deployed on a Salesforce technology platform and includes real time, directive-based dashboards for the advisor and support team. Not only do these dashboards help the team on a daily basis to laser focus on executing the right practice management tasks, but the dashboards also help the advisor gauge how the management system program is performing overall in the practice.

The four major functions of the management system 100 as shown include: a team-based approach 102, sales pipeline management 104, the trusted advisor program 106, and directive-based dashboards 108.

As will be further described below, the combination of the team-based approach 102 and sales pipeline management 104 helps to free-up time to fill the advisor's calendar with qualified appointments. The trusted advisor program 106 increases client loyalty and reduces client attrition. The directive-based dashboards 108 provide an effective way to manage the practice. The management system 100 systematically offers sales and client campaigns, checkup calls, workflow automation, and a library of messaging content to ensure clients are "touched" or "communicated with" on a frequent and consistent basis.

The management system 100 can work with any third-party lead generation program as part of a campaign. A library of more than thirty predefined campaigns (e.g. referral, old prospect, seminar, client review, new opportunity, life insurance) is available. The predefined campaigns include built-out offer messaging and scripts that can be easily customized and sent to an advisor for compliance and advisor approval. In addition to predefined campaigns, the system includes a library of over four hundred campaign ideas in the areas of estate planning, financial planning, and retirement planning.

Client 4 Life Management System

Figure 2:
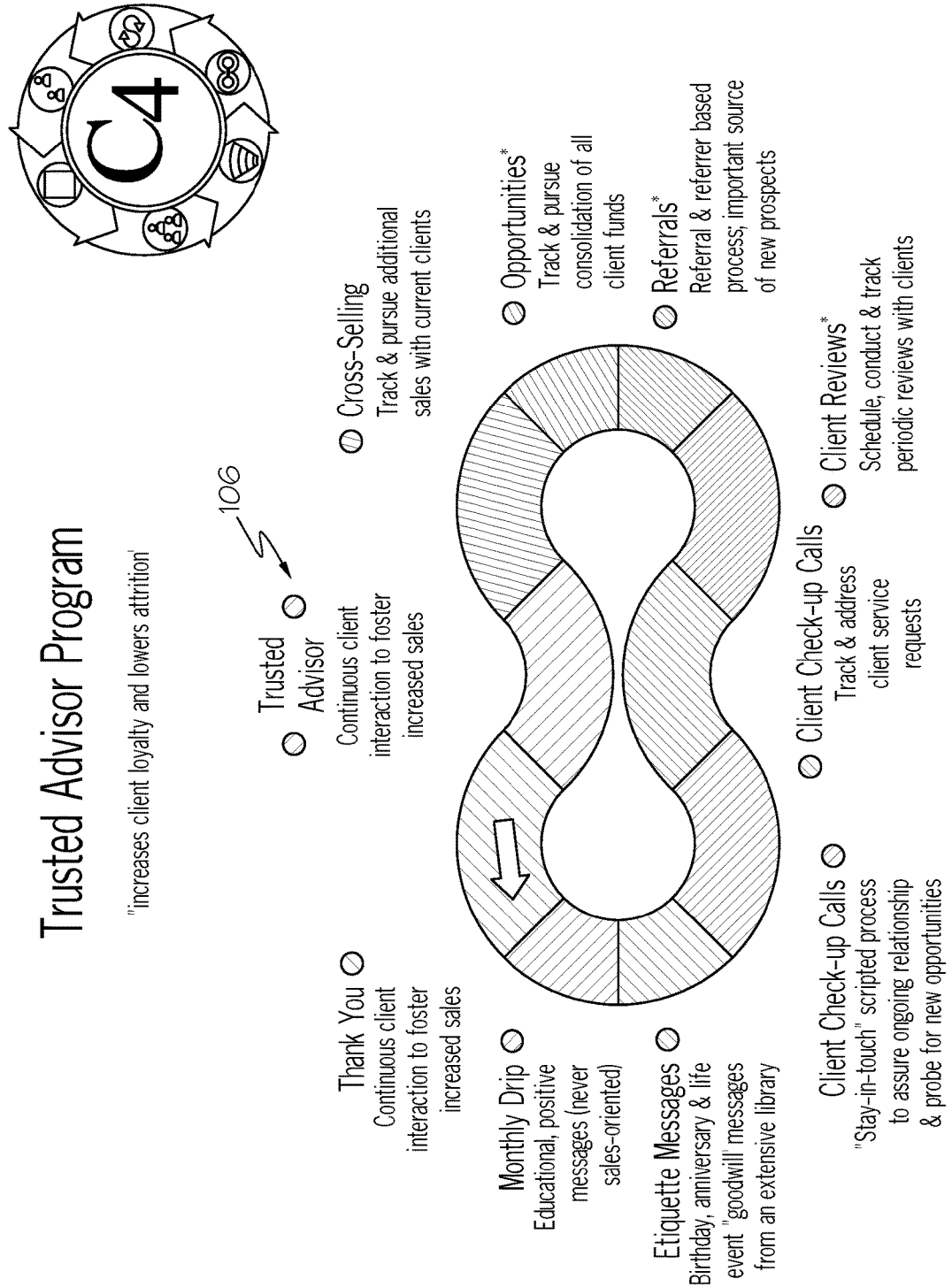
FIG. 2 is a diagram illustrating the key tenets of the trusted advisor function of the management system of FIG. 1.

The Client 4 Life Management System is the commercial name for the management system of the present invention. The major features and functions include:

Directive-Based Dashboards
  Tasks
    Appointment Preparation to Complete
    Meeting Notes to Complete
    Opportunities to Pursue
    View of Appointments Scheduled Next 4 Weeks
  Trusted Advisor Program
    Access to Full Messaging Library
    Etiquette Messaging
    Checkup Calls Due
    Client Reviews Due
    Automated Monthly Email Drip Campaign
  Program Stats Reporting
    Meetings Scheduled
    Meetings Held
    Opportunities Won
    Referrals Received
    AUM (Assets Under Management) and Production Tracking by Campaign/Sales Effort
Checkup Calls: C4L staff calls and checks on Advisor's clients to solidify Trusted Advisor status; Advisor and staff have access to execute decision-tree, scripted, and fully integrated Checkup Call process
Monthly Drip: C4L staff selects 12 monthly drip messages per year that automatically go to clients and prospects; Advisor has ability to replace messages
Practice Management Support
  C4L staff effectively manages C4, task assignments, and dashboards
Sales Pipeline Management—C4L staff professionally manages sales campaigns and sets qualified appointments using:
  Campaign Management
    C4L staff implements, administers and manages Sales Campaigns
    Standard Campaigns: Advisor has access to a library of standard sales campaigns already fully integrated into the C4L system
    Custom Campaigns
  Appointment Management
    C4L staff uses pre-approved, decision-tree, system-integrated scripts to continuously fill Advisor's calendar with qualified appointments
  Weekly Sync Meetings
    C4L staff meets weekly with Advisor to:
      Review last week's activity results
      Plan and prioritize next week's activity goals
      Review sales campaigns
Trusted Advisor Program FIG. 2 is a diagram illustrating the key tenets of the trusted advisor program function of the management system of FIG. 1;

Sales Pipeline Management

Figure 3:
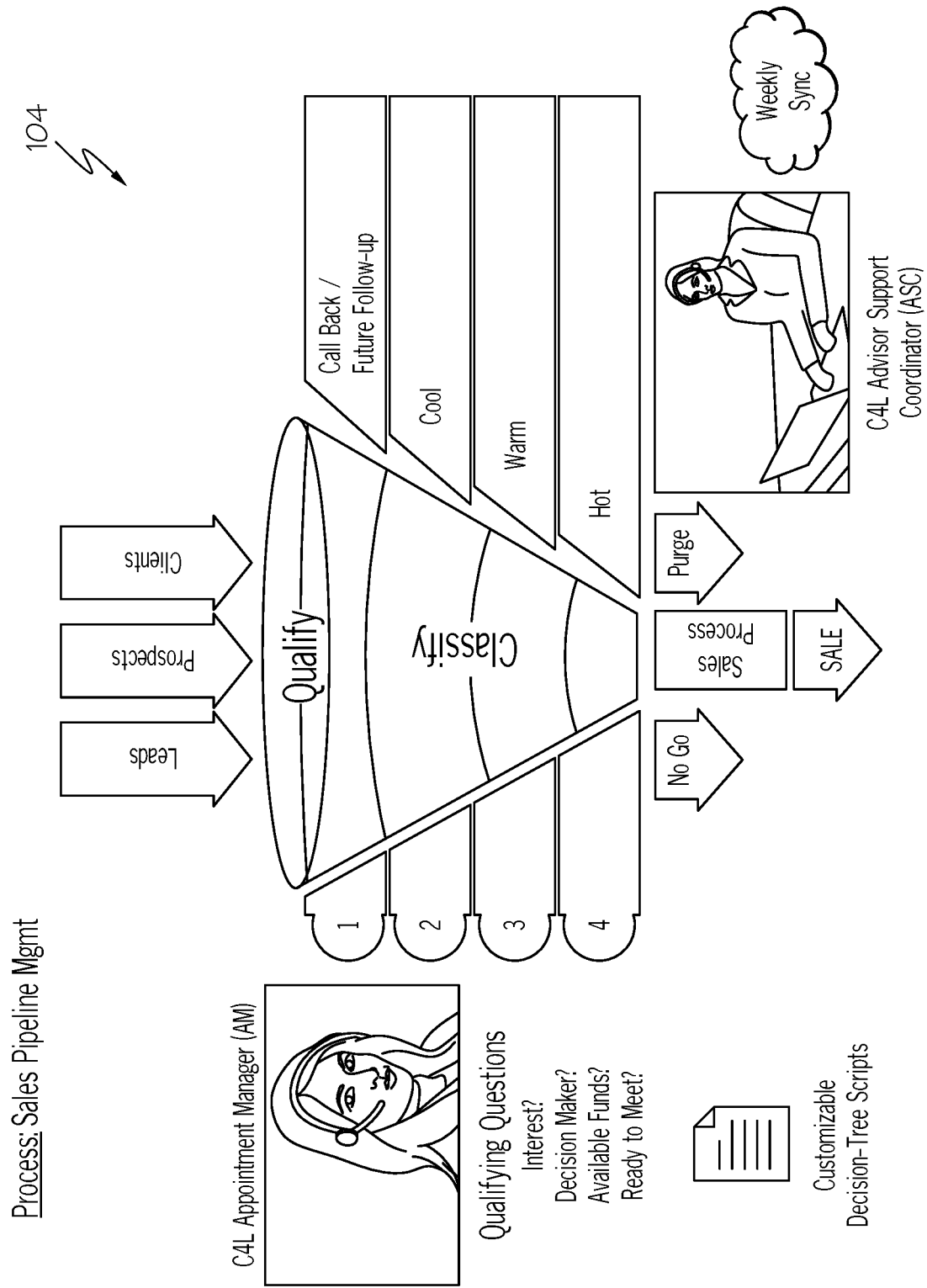
FIG. 3 is a diagram illustrating the major aspects of the sales pipeline management function of the management system of FIG. 1, including the qualification and classification process.
Figure 4A:
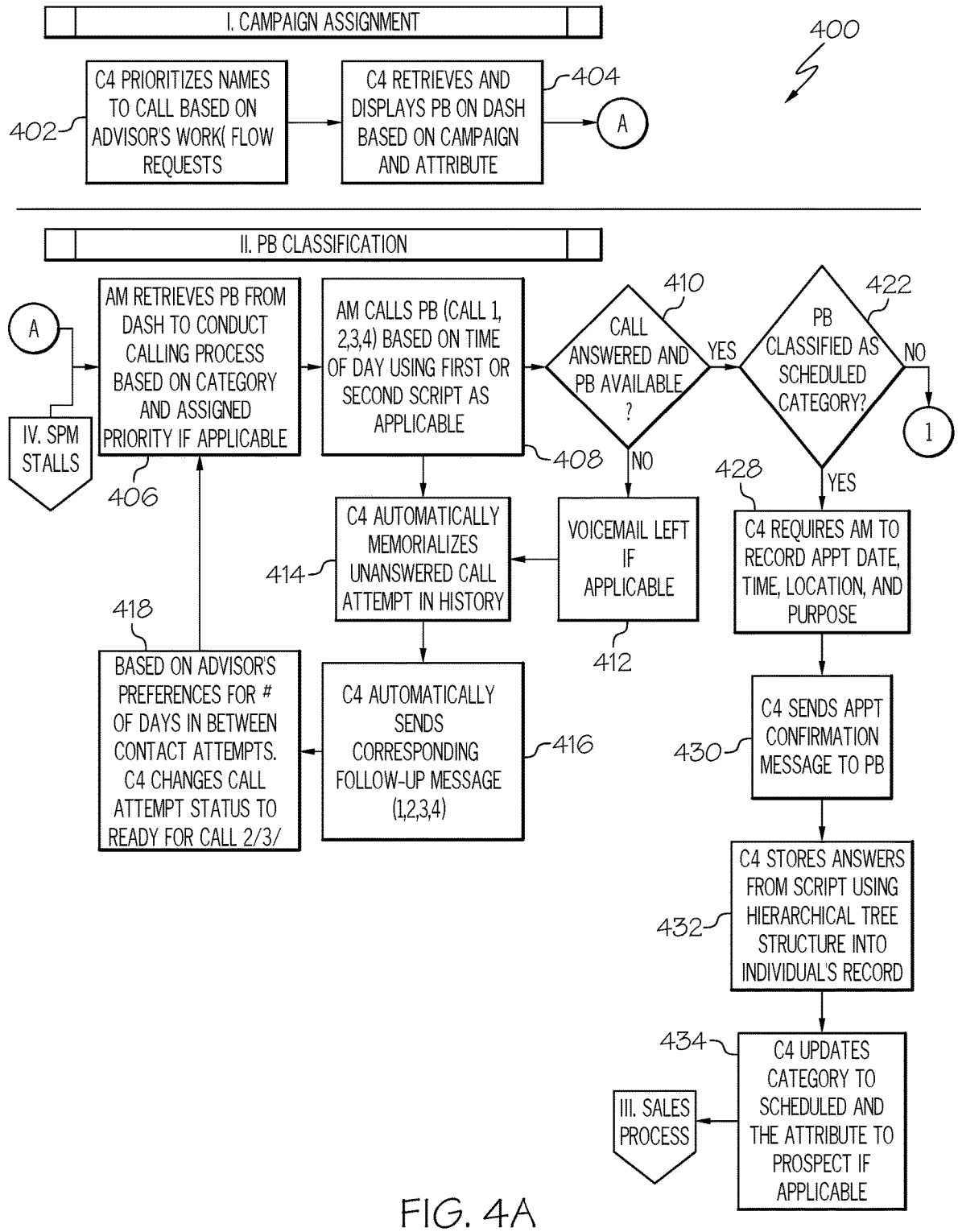
FIG. 4A to FIG. 4D is a flow diagram of the sales pipeline management process of FIG. 3.
Figure 4B:
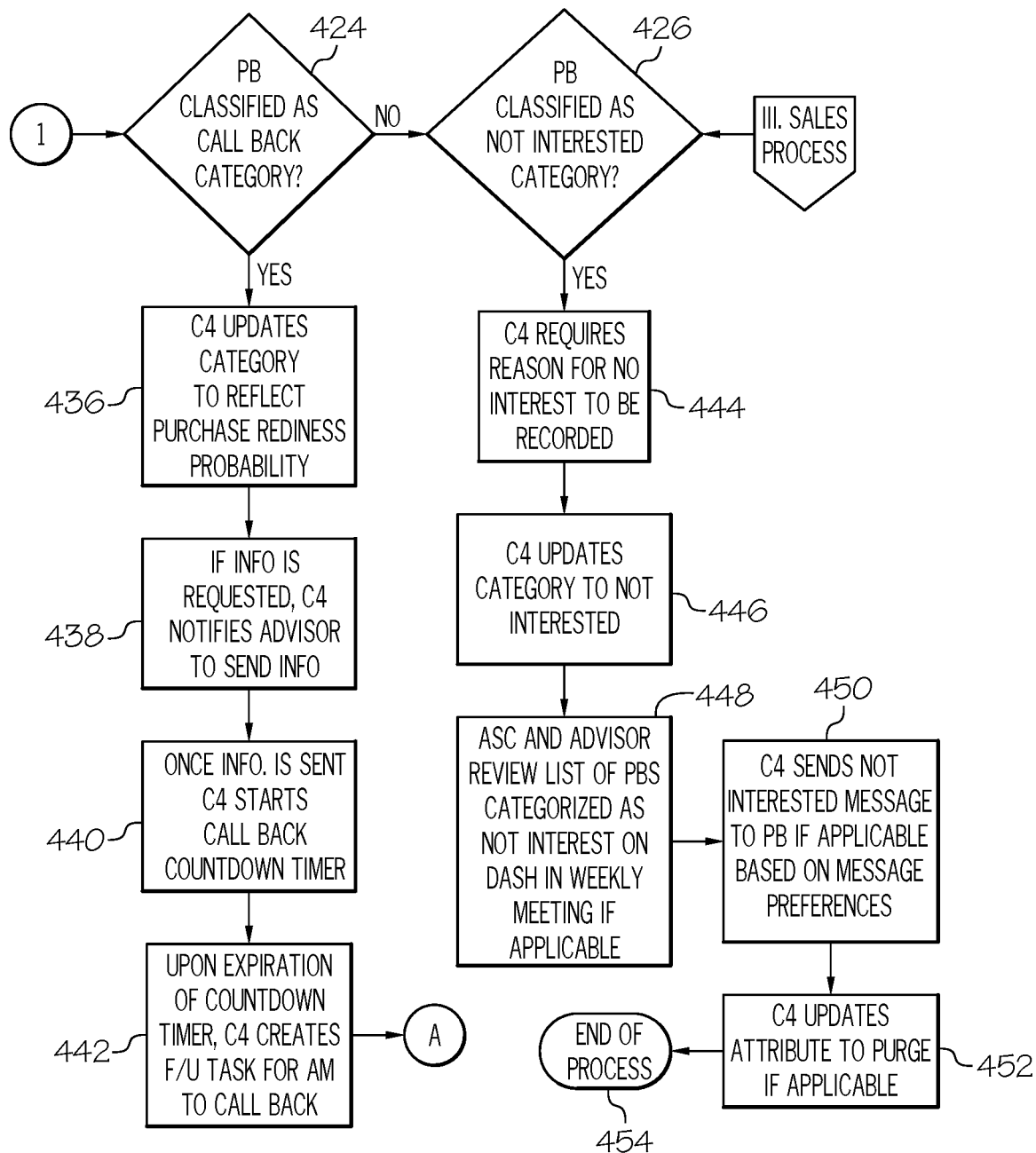
Figure 4C:
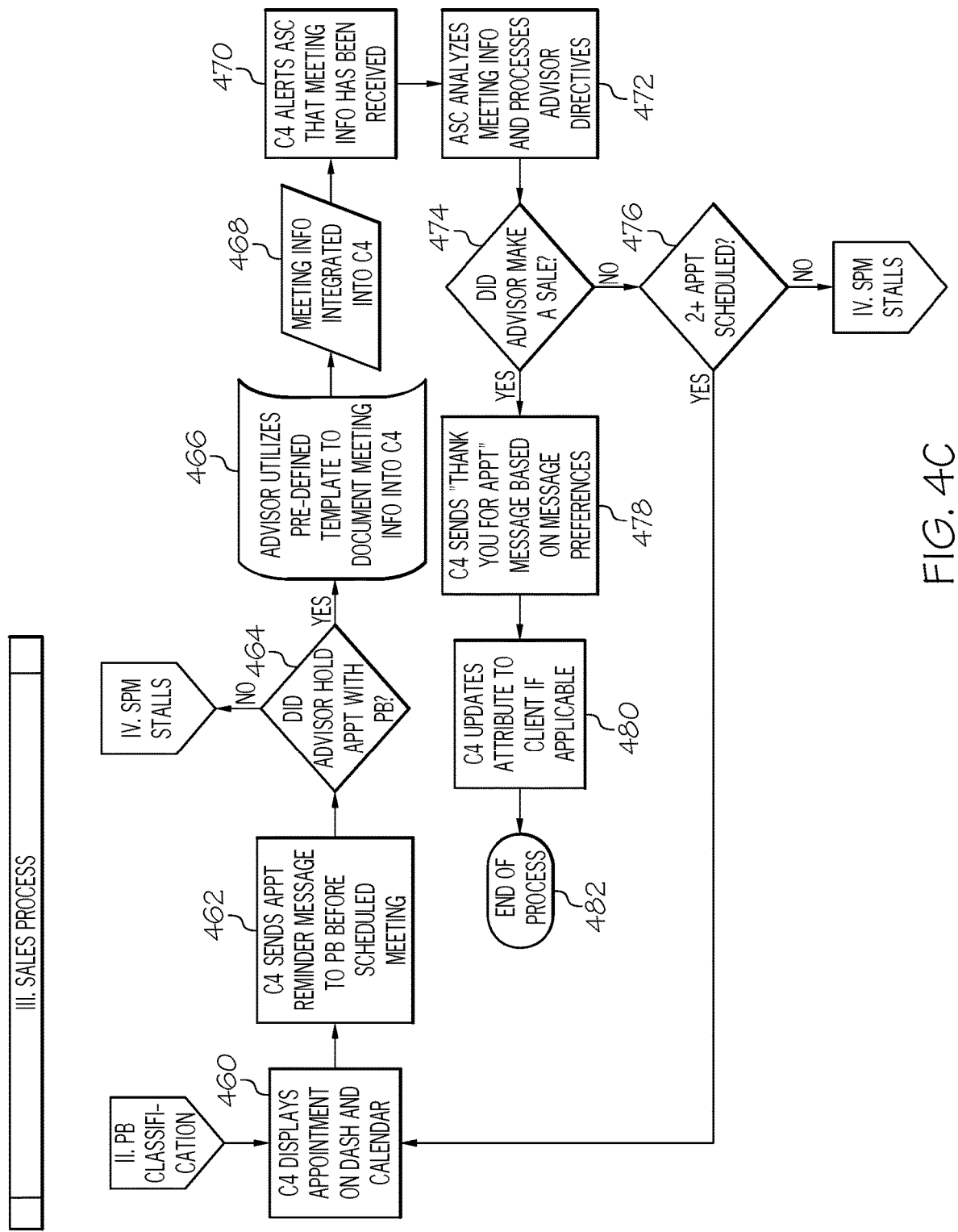
Figure 4D:
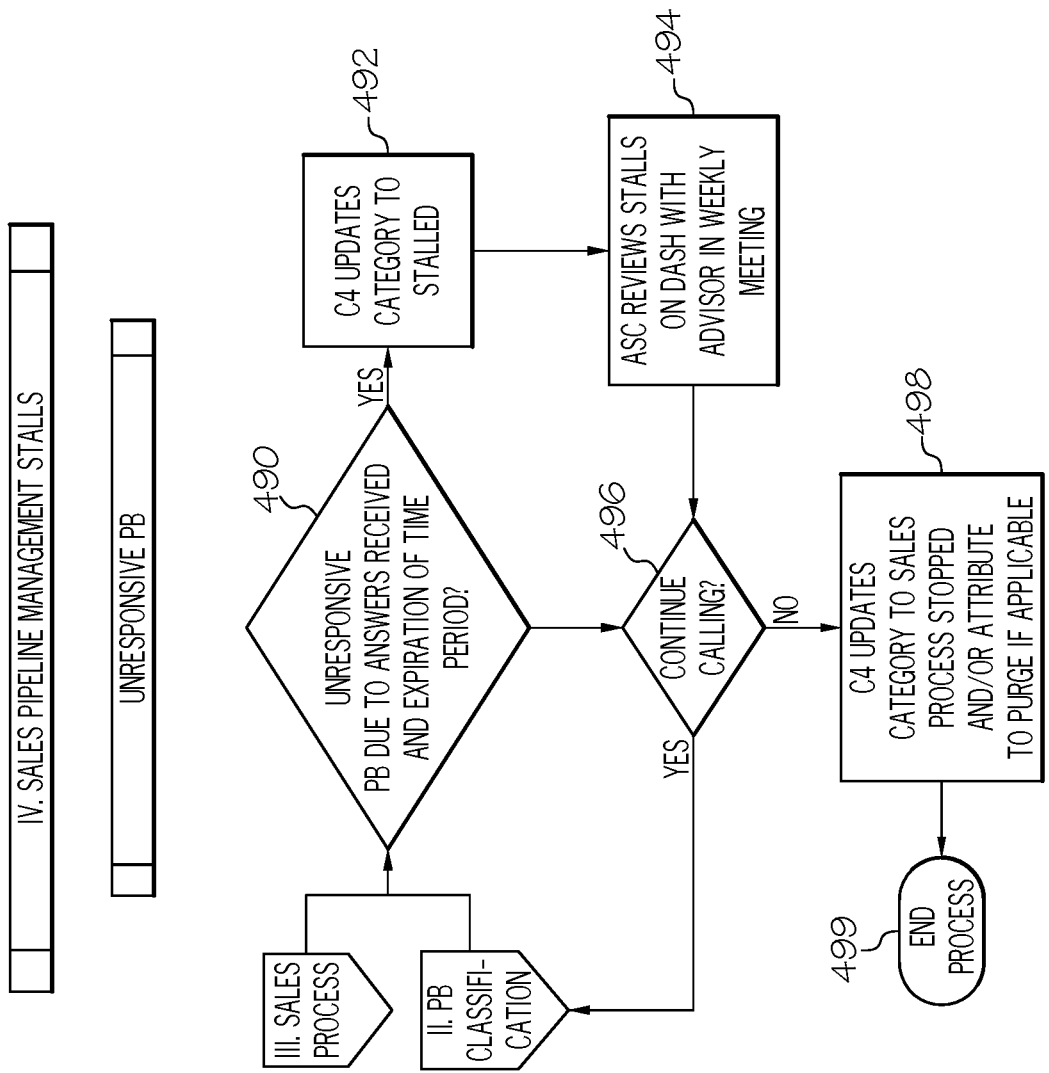
Figure 5A:
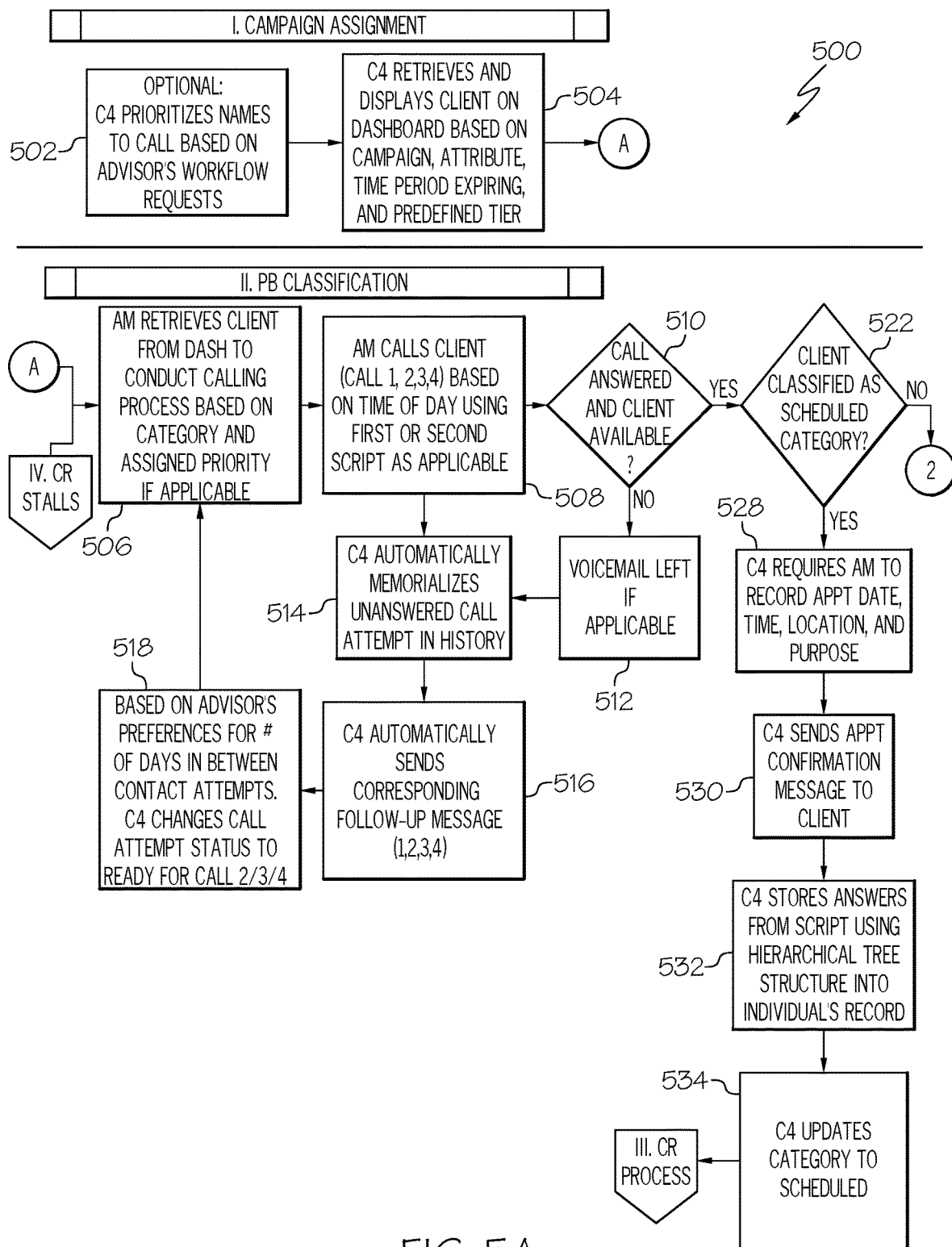
FIG. 5A to FIG. 5D is a flow diagram of the client review process of FIG. 2.
Figure 5B:
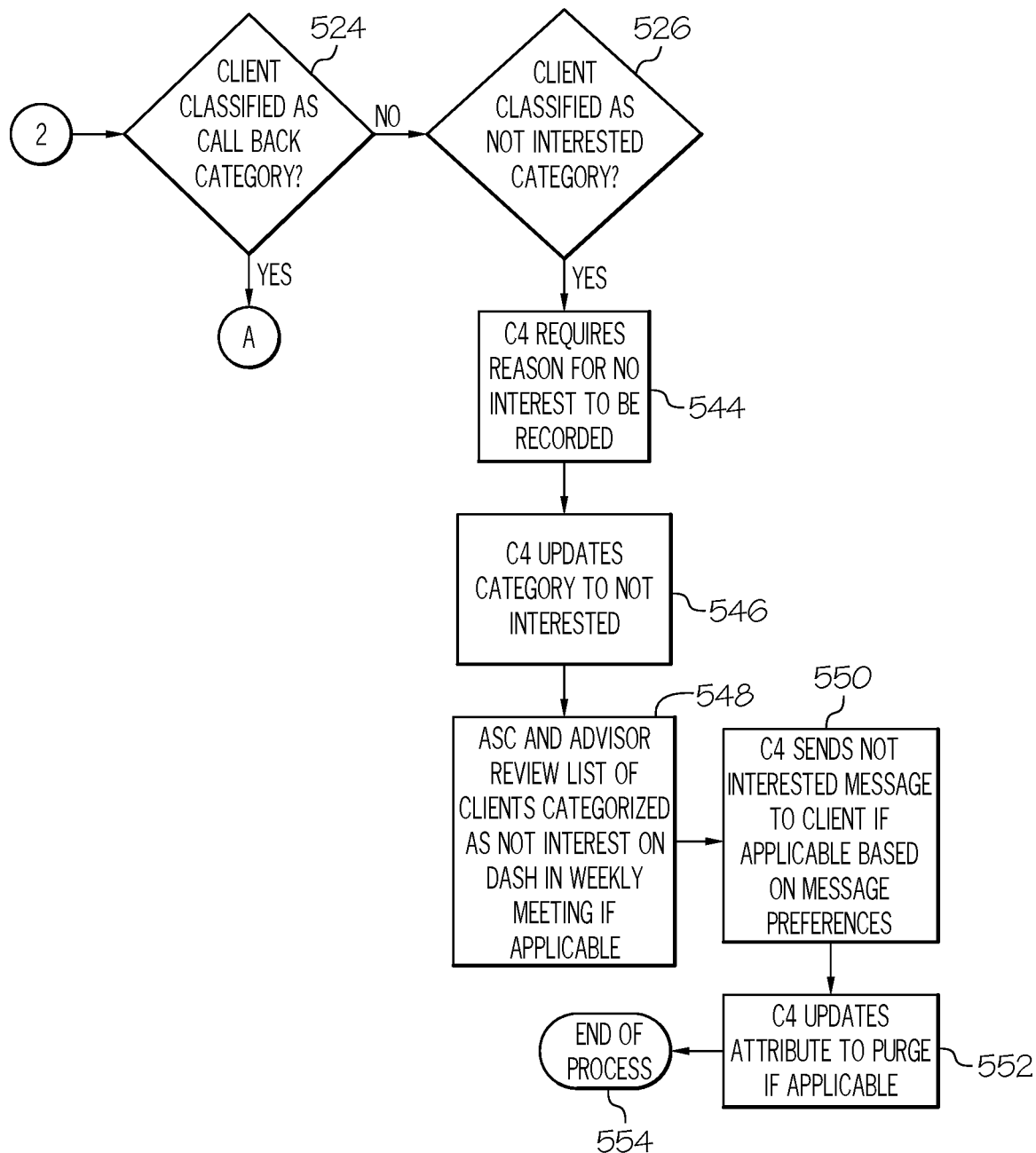
Figure 5C:
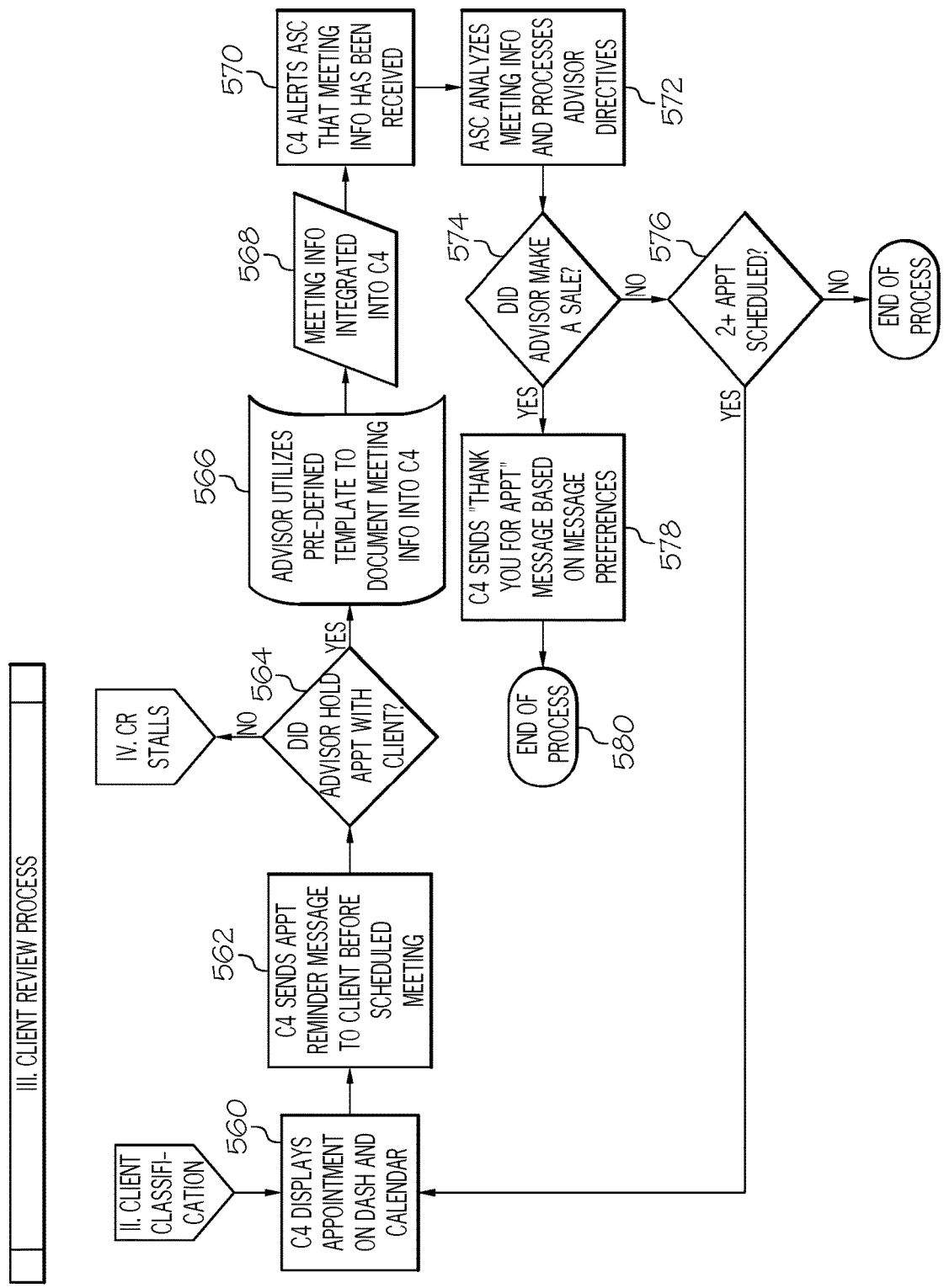
Figure 5D:
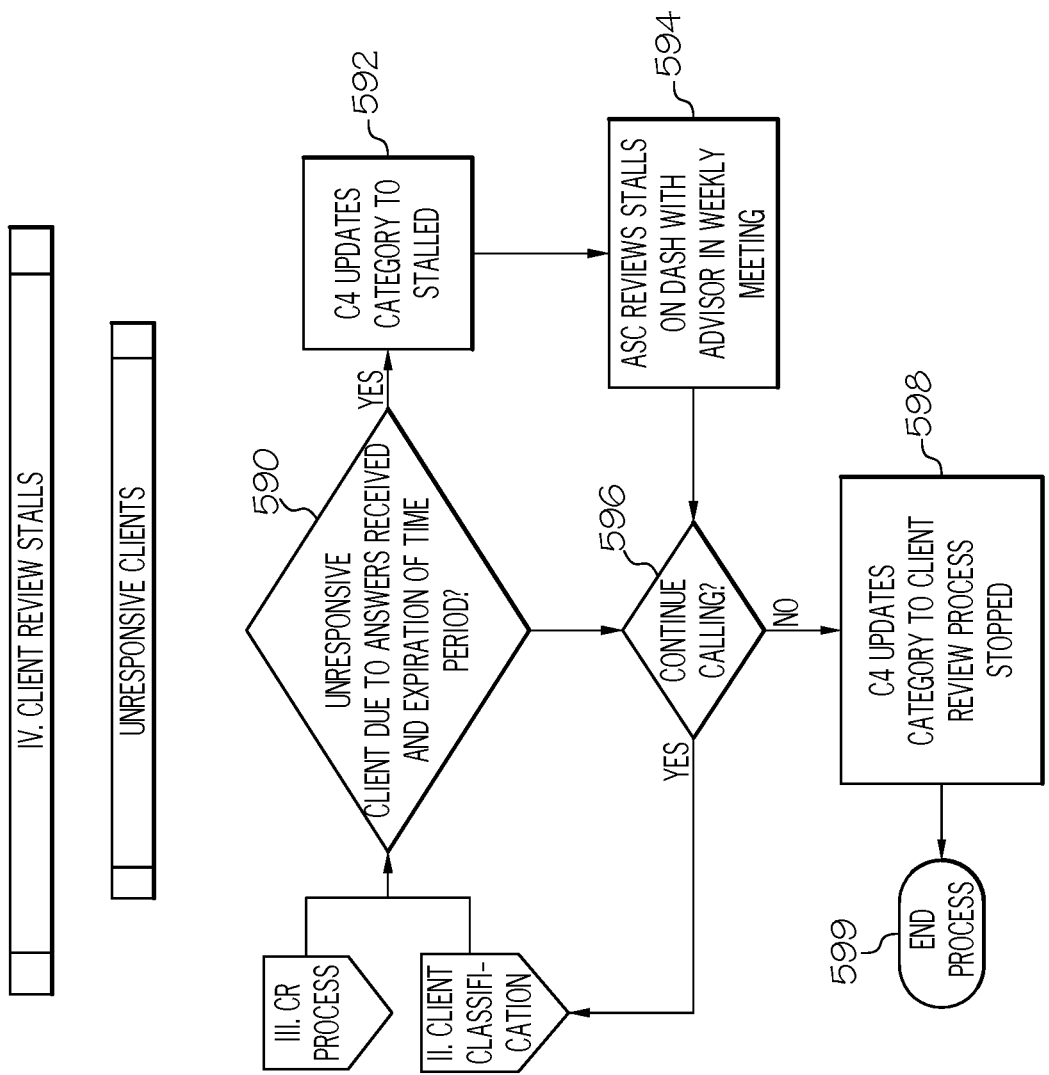

FIG. 3 is a diagram illustrating the major aspects of the sales pipeline management function of the management system of FIG. 1, including the qualification and classification process.

Directive-Based Dashboards

The management system 100 includes proprietary dashboards to automatically display relevant C4L-specific information in real time per user. The present invention utilizes dozens of dynamic variables and formulas that constantly check specific conditions to determine when information should be displayed. The dashboards 108 are interactive and allow users to make updates directly on them. The dashboards 108 are also built to be easily customizable to add or remove components.

The management system 100 includes several role-based dashboards. Each team member utilizes a customizable dashboard to manage specific tasks and activities, which is the foundation of the team-based approach to running the practice.

Sales Pipeline Management (Campaigns)

The present invention includes a proprietary, advanced campaign tracking system that manages an advisor's sales pipeline by tracking and recording campaign members' journey through the pipeline and in their associated campaign.

The management system campaigns are highly customizable. Staff can create and assign custom calling scripts, assign custom email messages to specific tracks, change the location where appointments should be scheduled for that campaign, how often and how many times the account manager (or AM) should call prospects/clients, and to configure dozens of other custom settings.

Campaigns are designed to continuously check the status of campaign members to decide what actions, if any, should occur based on the member's specific circumstances. When certain conditions are met, the campaign code automatically moves members to the next relevant track, alerts the account manager (or ASC) if there are any problems, queues up emails to be sent, and updates relevant tracking information.

Appointment Management

The account manager (or AM) utilizes highly customizable calling scripts developed and coded in the C4L system using decision tree workflow to systematically decide what the account manager should verbalize to a potential buyer based on answers provided from each follow-up question. The decision-tree workflow is a hierarchical tree structure that summarizes answers in a predefined format as part of a database record.

Using "smart" technology, the present invention, using the hierarchical tree structure, automatically decides appropriate scripting paths and then creates updates and activities that should occur in the system based on the progress and outcome of the conversation.

The management system 100 scripts check the contact record and then display relevant and important information specific to that contact, advisor, and campaign, such as important calling information noted by the advisor, the spouse's name, where meetings should be scheduled, a brief bio of the advisor, information about the advisor's team and office, and a map of the advisor's office location(s).

Once the account manager (or AM) reaches the end of the script, the present invention will automatically log the full conversation in the system, move the contact through the campaign tracks, create relevant tasks, send relevant emails, and create future meeting events.

The management system 100 scripts are coded so that language can be easily customized and assigned to various advisor versions of standard campaigns. This means that, as an example, the Client Review campaign for an advisor X can have different script language from the language used for the Client Review campaign for an advisor Y.

Sales Pipeline Management Flow

FIG. 4A to FIG. 4D is a flow diagram 400 of the sales pipeline management of FIG. 3. The following is a key to the abbreviations used in this flow:

Boxes shown in broken lines are optional steps.
"C4" is an abbreviation for the Client 4 Life management system.
"PB" is an abbreviation for the potential buyer.
"Dash" is an abbreviation for dashboard.
"AM" is an abbreviation for account manager.
"ASC" is an abbreviation for advisor support coordinator.
"Attribute" is a short hand for "Client Attribute" used herein The flow chart 400 is broken into four sections: I. Campaign Assignment; II. PB Classification; Ill. Sales Process and IV. Sales Pipeline Management Stalls.

The process starts in section: I. Campaign Assignment with step 402, in which the management system automatically prioritizes names to call based on the advisor's workflow request. In one example, the campaign is automatically populated with the names to call without the account manager's involvement. The efficient, ongoing manipulation of names in the campaign is also carried out to account for advisor's variable workflow requests.

This step 402 flows into step 404. In step 404, the management system automatically retrieves and displays the potential buyer on the dashboard based upon the selected campaign and the client attribute of the potential buyer. The process flows to step 406 of section II. PB Classification.

In step 406, the account manager retrieves via the dashboard a record from the database associated with the potential buyer to conduct a calling process. If the potential buyer has already been called using the first script and was classified into the call back category, a high priority will be assigned to call them back before calling unclassified potential buyers. The process flows into step 408.

In step 408, the account manager calls the potential buyer. There can be "n" number of call attempts. The inventors have found that n equal to four is an optimum number of calls for this system when applied to the financial industry. However, other numbers of calls may be possible for different industries. When the call is made is also dependent on the time of day. The inventors have discovered that varying the time of day is most effective in reaching a potential buyer. For example, calling twice in the afternoon, once in the evening, and once in the morning produces the best results. The account manager uses either a first or second script depending on whether the potential buyer has been previously called and classified into the call back category. The process flows into the next step 410.

In step 410, a test or determination is made whether the potential buyer answers and is available. In the case that potential buyer is not available, the process continues in a loop for the given number of call attempts "n". The loop consists of steps 412 through 418 to return to step 406. In step 412, a voice message is left by the account manager if they receive the potential buyer's voice mail box. The flow proceeds to step 414 in which the management system automatically memorializes the unanswered call attempt into the record in the database associated with the potential buyer. The flow proceeds to step 416, in which the management system automatically sends corresponding follow-up messages to the advisor based on the number of the call attempt. The flow continues into step 418 in which, based on the advisor's preferences for a number of days between call attempts, the management system changes the call attempt status number "n". Once the number of days has lapsed, the process returns to step 406. Otherwise, if the potential buyer has answered the call in step 410, the process flows into step 422.

In step 422, a test is made to determine whether the potential buyer is classified based on the phone call into the "scheduled category". In the event that the potential buyer is scheduled, the process flows to step 428. Otherwise, the process continues to step 424.

In step 424, a test is made to determine whether the potential buyer is classified based on the phone call into the "call back category". In the event that the client is classified into the "call back category", the process flows to step 436. Otherwise, the process continues to step 426.

In step 426, it is determined that the potential buyer is classified based on the phone call into the "not interested category", where the process flows to step 444.

In step 428, in which the potential buyer is in the "scheduled category", the management system guides the account manager to record the appointment date, time, location, and purpose of the meeting. The process flows to step 430.

In step 430, the management system automatically sends an appointment confirmation message to the potential buyer. The process flows to step 432, in which the system stores the answers from the script used by the account manager to schedule the call into the record in the database associated with the potential buyer using a hierarchical tree structure. The process flows to step 434, in which the management system automatically updates the category to "scheduled". If the client attribute of the potential buyer is currently "lead", then the client attribute is automatically updated to "prospect" since they have now shown interest by scheduling an appointment. The process continues to section III. Sales Process.

In step 436, in which the potential buyer is in the "call back category", the system updates the category for the potential buyer to reflect their ready to purchase probability. The process continues to step 438. If the potential buyer requests more information before they are willing to schedule an appointment, the management system notifies the advisor via the dashboard to send out information, in an attempt to "warm" them up to scheduling an appointment. The process continues to step 440, in which after the advisor indicates that the information has been sent, the management system automatically starts a timer for when to call the potential buyer back to attempt to schedule an appointment. The process continues to step 442, in which the process returns to step 406 upon the expiration of the call back timer.

In step 444, in which the potential buyer is classified into the "not interested category", the management system requires the reason for no interest be recorded by the account manager. The reason in one example may be selected from a prepopulated list or typed in manually. The process flows to step 446, in which the management system updates the category for the potential buyer to "not interested". The process continues to step 448, in which the management system updates the dashboard to reflect the "not interested" category for the advisor support coordinator and advisor to review during their regularly scheduled meeting. This meeting is typically weekly but other intervals can be set up as well. If we have arrived at this step from classifying the potential buyer as "not interested" from III. Sales Process, this review step is skipped because the advisor is already aware that the potential buyer was not interested. The process continues to step 450, in which the management system may send a message to the potential buyer confirming that there is no interest and thanking them for their time.

This message is dependent on the advisor's set preferences in the management system. The process continues to step 452, in which the potential buyer's client attribute is set to "purge" if their current client attribute is either "lead" or "prospect" and they and/or the advisor does not wish to continue with the relationship or their client attribute is "client" but they let us know that they are no longer a client. The process ends in step 454.

The category III. Sales Process is entered in step 460, in which the management system displays the scheduled appointment on the advisor's dashboard and calendar. The process continues to step 462, in which the management system automatically sends a reminder message to the potential buyer the day before the scheduled meeting. The process continues to step 464, in which a test is made to determine whether the advisor held the scheduled meeting with the potential buyer. In the event that the scheduled meeting was not held, the process continues to IV. Sales Pipeline Management Stalls. The process continues to step 466 in which the advisor utilizes a predefined template to document the meeting. The process continues to step 468, in which the meeting note is integrated into the record in the management system associated with the potential buyer. The process continues to step 470, in which the management system automatically alerts the advisor support coordinator that meeting information has been received. The process continues to step 472, in which the advisor support coordinator analyzes the meeting information and processes the advisor's directives. The process continues to step 474, in which a test is made to determine whether the advisor made a sale. If no sale was made, the process continues to step 476. Otherwise, the process continues to step 478.

In step 476, a test is made to determine whether an additional appointment was scheduled. If an additional appointment was scheduled, the process returns to step 460, in which the management system displays the appointment on the advisor's dashboard and calendar. Otherwise, the process proceeds to step 426 under II. PB Classification, because it has been determined that they are not interested in the sales offer.

In step 478, in the event the advisor made a sale, the management system automatically sends a thank you message based on the advisor's predefined preferences. The process continues to step 480, in which the management system updates the potential buyer's client attribute to "client" (if their current client attribute is not already "client"), because they are no longer a potential buyer since a sale was made. The process ends in step 482.

The section IV. Sales Pipeline Management Stalls is entered from either section II. PB Classification or III. Sales Process and flows into step 490, in which it is determined that the potential buyer is unresponsive due to the expiration of a time period in which we received no answer from them. The process flows to step 492, in which the system updates the category of the potential buyer to "stalled". The process continues to step 494, in which the advisor support coordinator reviews the stalls on the dashboard with the advisor in a regularly scheduled meeting. The process continues to step 496, in which a determination is made by the advisor on whether to continue calling. If the advisor wants to continue calling, the process continues to step 406 under the II. PB Classification section. Otherwise, the process continues to step 498, in which the management system updates the category of the potential buyer to sales process stopped and/or their client attribute to "purge" if their current client attribute is either "lead" or "prospect" and they and/or the advisor does not wish to continue with the relationship. The process continues to step 499, in which it ends.

Trusted Advisor Program

Monthly Drips/Etiquette Messaging

One of the most powerful components of management system 100 is that clients receive advisor-branded monthly drips and etiquette messages all facilitated by tech-enabled processes. The management system 100 provides a library of hundreds of educational, life lesson, feel-good, holiday/seasonal, birthday, wedding anniversary and other "goodwill" content. Some messages are sent out automatically (e.g. birthday and anniversary) while others are sent out individually as needed (e.g. condolence, get well, loss of a beloved pet, birth of a child or grandchild, graduation, and congratulations). Based on advisor-determined configurations, etiquette messaging is either emailed or printed and mailed. Monthly drips are emailed.

The present invention includes a custom messaging system that allows the creation of unique monthly drips and etiquette messages for each advisor.

Pending messages are displayed on the directive-based dashboard for the advisor and local team to review.

The advisor can then decide to send the message or schedule it for a future date.

Once sent, the management system 100 automatically logs a copy of the exact message sent to each contact on their record.

The management system 100 reports on the results of the message, including who opened the message and when.

The management system 100 includes a custom messaging system that automatically processes life event, wedding anniversary, and birthday messages at the correct time for each client in the advisor's book. For those clients who are configured to receive etiquette messaging via email, these messages go out automatically on the day of and are reported on the advisor's directive-based dashboard. For those clients who are configured to receive etiquette messaging via posted mail, these messages are queued on the advisor's dashboard several days in advance so that they may print and mail these messages (and even allow the advisor to sign and personalize them before they go out).

The management system 100 serves as a library for pre-defined etiquette and monthly drip messages where an advisor can view and send the message to their contacts.

Client Checkup Calls

Figure 6:
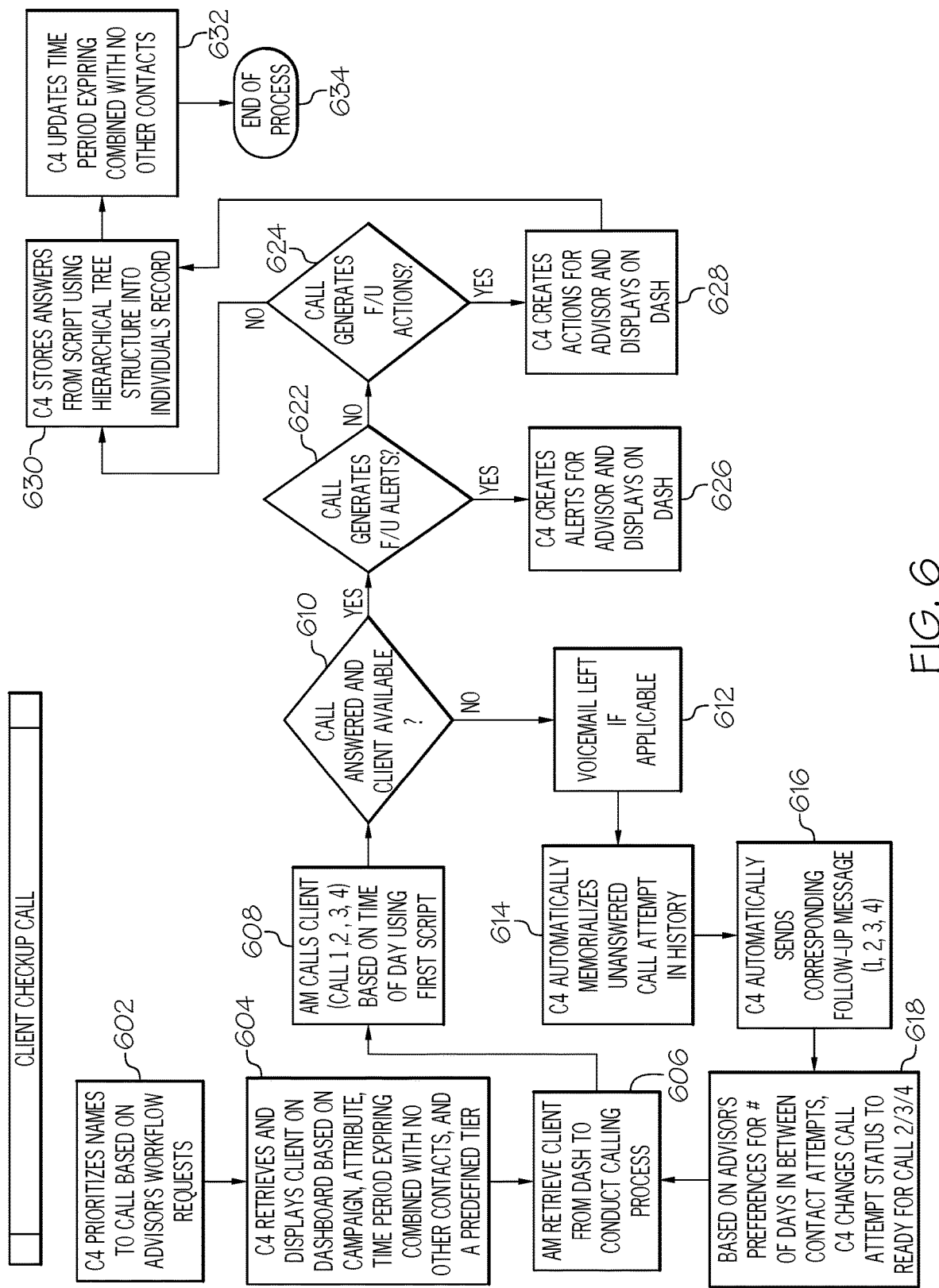
FIG. 6 is a flow diagram of the client checkup call process of FIG. 2.

FIG. 6 is a flow diagram 600 of the client checkup call process of FIG. 2. The identical abbreviations described for FIG. 4 are used here as well.

The checkup call process is useful in many different aspects. These aspects include checking with the client for any or all of:

updates to contact information, service issues/requests, and changes in financial status.

Each of the above referenced script aspects can be turned on or off on the integrated scripts utilized by the account manager, the advisor, or the advisor's assistant(s).

Client checkup calls are a key tenet of the trusted advisor program 106. Clients periodically receive a live call to ensure the advisor and his/her team is meeting expectations. Any need for action or follow-up instantly shows up on the advisor's directive-based dashboards 108 or more simply referred to as "dashboards", which are graphical user interface widgets indicating status of the client relationship process. This dashboard 108 typically shows the status for all clients of the advisor.

In addition to addressing client concerns and building goodwill, checkup calls are a proven source of finding new sales opportunities otherwise unknown to the advisor. Advisors determine the frequency of these calls using management system 100 book segmentation features. For example, a tier 1 client could be set up for checkup calls once a quarter while a tier 3 client could be set up for checkup calls once a year. Further, Advisors determine which tiers are called by whom. For example, a tier 1 client could be set up for checkup calls to be made by the Advisor's assistant while a tier 3 client could be set up for checkup calls to be made by the account manager (or AM). The management system 100 helps advisors stay in touch with the 80% of the book that historically drives 20% of the revenue. The management system systematically keeps in touch with lower-tier clients. This results in lower client attrition and more future opportunities to increase investments that otherwise would not happen.

The management system 100 includes an advanced system that uses custom formulas and variables to determine when a client should be called for a checkup call, which results in an alert on the directive-based dashboard at the relevant time. Once the advisor makes the decision that the client should be called, the AM or other designated party uses the management system-created, specialized calling scripts that utilize decision tree-based workflow. The script is highly customizable and allows changes to the questions asked by the caller.

If relevant information is discovered during the client checkup call, the proprietary code logs that information and creates a task visible immediately on the advisor's dashboard, alerting them to review and decide if further actions are warranted.

The script dynamically displays important information like if the client celebrated a recent birthday or wedding anniversary, important notes specific to that client, information about the advisor, and/or any prior service issues.

At the conclusion of the script process, the present invention memorializes the results of the call including documenting the content of the call, updating the last contact/checkup call date, creating relevant tasks, alerting the advisor if important service issues were discussed, and creating any new opportunities discovered.

FIG. 6 is a flow diagram 600 of the client checkup call process of FIG. 2. The identical abbreviations described for FIG. 4 are used here as well.

In one example, if there is missing client information, such as birth date and anniversary date, these questions are automatically added by the management system 100 to gather that information during the client checkup call process.

The process starts with step 602, in which the management system automatically prioritizes names to call based on the advisor's workflow requests. This step 602 flows into step 604. In step 604, the management system automatically retrieves and displays the client on the dashboard based upon the selected campaign, the attribute being client, a time period expiring combined with no other contacts, and the predefined tier for the client. The process flows to step 606.

In step 606, the account manager retrieves via the dashboard a record from the database associated with the client to conduct a calling process. The process flows into step 608.

In step 608, the account manager calls the client using a script. There can be "n" number of call attempts. The inventors have found that n equal to four is an optimum number of calls for this system when applied to the financial industry. However, other number of calls may be possible for different industries. When the call is made is also dependent on the time of day. The inventors have discovered that varying the time of day is most effective in reaching a client. For example, calling twice in the afternoon, once in the evening, and once in the morning produces the best results. The process flows into the next step 610.

In step 610, a test is made if the client answers and is available. In the case that the client is not available, the process continues in a loop for the given number of call attempts "n". The loop consists of steps 612 through 618 to return to step 606. In step 612, a voice message is left by the account manager if they receive the client's voice mail box. The flow proceeds to step 614, in which the management system automatically memorializes the unanswered call attempt into the record in the database. The flow proceeds to step 616, in which the management system automatically sends corresponding follow-up messages to the advisor based on the number of the call attempt. The flow continues to step 618 in which, based on the advisor's preferences for a number of days between call attempts, the management system changes the call attempt status number "n". Once the number of days have lapsed, the process returns into step 606. Otherwise, if the client has answered the call in step 610, the process flows into step 622.

In step 622, a test is made to determine whether the telephone call documented in the management system triggers a follow-up alert. In the event that the follow-up alert is generated, the process flows to step 626. Otherwise, the process continues to step 624.

In step 624, a test is made to determine whether the telephone call documented in the management system triggers a follow-up action. In the event that the follow-up action is generated, the process flows to step 628. Otherwise, the process continues to step 630.

In step 626, the management system automatically creates follow-up alerts for the advisor, which are displayed on the advisor's dashboard. The process flows to step 624.

In step 628, the management system automatically creates follow-up actions for the advisor, which are displayed on the advisor's dashboard. The process flows to step 630.

In step 630, the management system stores the answers from the script using a hierarchical tree structure into the individual's record in the database. The process continues to step 632, in which the management system updates the time period expiring combined with no other contacts status field. The process continues to step 634, in which the process ends.

Current Client Campaigns

The management system 100 utilizes the sales pipeline management 104 and campaign management functions as part of the trusted advisor program 106 to manage client reviews, referrals, and new sales opportunities with current clients. The systematized campaign approach previously discussed ensures that all opportunities are tracked through the sales pipeline and potential buyers are "warmed up" (or kept in contact with) via follow-up information and timely callbacks or removed from the pipeline as appropriate.

Client Reviews

The management system 100 uses a complex set of formulas and variables to check when a client is due for a review. The code checks when the last review was, if the client was recently called, if the client is currently active in another campaign, if the advisor recently attempted to schedule a review but was unsuccessful, and several other variables. Once coded conditions are met and no conflicts exist, the directive-based dashboards display the contact on the "reviews due" component. The client review candidate is then discussed at the weekly sync meeting to determine if the advisor wants to initiate setting up a client review meeting through the account manager calling process.

The flow chart 500 is broken into four sections: I. Campaign Assignment; II. Client Classification; III. Client Review Process and IV. Client Review Stalls.

FIG. 5A to FIG. 5D is a flow diagram 500 of the client review process of FIG. 2. The process starts in section: I. Campaign Assignment with step 502, in which the management system automatically prioritizes names to call based on the advisor's workflow request. This flows into step 504. In step 504, the management system automatically retrieves and displays the client on the dashboard based upon the selected campaign, the client attribute being client, a time period expiring, and the predefined tier for the client. The process flows to step 506 of section II. Client Classification.

In step 506, the account manager retrieves via the dashboard a record from the database associated with the client to conduct a calling process. If the client has already been called using the first script and was classified into the call back category, a high priority will be assigned to call them back before calling unclassified potential buyers and clients. The process flows into step 508.

In step 508, the account manager calls the client. There can be "n" number of call attempts. The inventors have found that n equal to four is an optimum number of calls for this system when applied to the financial industry. However, other numbers of calls may be possible for different industries. When the call is made is also dependent on the time of day. The inventors have discovered that varying the time of day is most effective in reaching a potential buyer. For example, calling twice in the afternoon, once in the evening, and once in the morning produces the best results. The account manager uses either a first or second script depending on whether the client has been previously called and classified into the call back category. The process flows into the next step 510.

In step 510, a test is made if the client answers and is available. In the case that the client is not available, the process continues in a loop for the given number of call attempts "n". The loop consists of steps 512 through 518 to return to step 506. In step 512, a voice message is left by the account manager if they receive the client's voice mail box. The flow proceeds to step 514 in which the management system automatically memorializes the unanswered call attempt into the record in the database associated with the client. The flow proceeds to step 516 in which the management system automatically sends corresponding follow-up messages to the advisor based on the number of the call attempt. The flow continues to step 518 in which, based on the advisor's preferences for a number of days between call attempts, the management system changes the call attempt status number "n". Once the number of days has lapsed, the process returns into step 506. Otherwise, if the client has answered the call in step 510, the process flows into step 522.

In step 522, a test is made to determine whether the client is classified based on the phone call into the "scheduled category". In the event that the client is scheduled, the process flows to step 528. Otherwise, the process continues to step 524.

In step 524, a test is made to determine whether the client is classified based on the phone call into the "call back category". In the event that the client is classified into the "call back category", the process flows to back to section II. Client Classification at step 506. Otherwise, the process continues to step 526.

In step 526, the client is classified based on the phone call into the "not interested category". The process flows to step 544.

In step 528, in which the client is in the "scheduled category", the management system guides the account manager to record the appointment date, time, location, and purpose of the meeting. The process flows to step 530.

In step 530, the management system automatically sends an appointment confirmation message to the client. The process flow to step 532, in which the system stores the answers from the script used by the account manager to schedule the call into the record in the database associated with the client using a hierarchical tree structure. The process flows to step 534, in which the management system automatically updates the category to "scheduled". The process continues to section III. Client Review Process.

In step 544, in which the client is in the "not interested category", the management system requires the reason for no interest be recorded by the account manager. The reason in one example may be selected from a prepopulated list or typed in manually. The process flows to step 546, in which the management system updates the category for the client to "not interested". The process continues to step 548, in which the management system updates the dashboard to reflect the "not interested" category for the advisor support coordinator and advisor to review during their regularly scheduled meeting. This meeting is typically weekly but other intervals can be set up as well. The process continues to step 550, in which the management system may send a message to the client confirming that there is no interest and thanking them for their time. This message is dependent on the advisor's set preferences in the management system. The process continues to step 552, in which the client attribute is set to "purge" if they let us know that they are no longer a client, and the process ends in step 554.

The category III. Client Review Process is entered in step 560, in which the management system displays the scheduled appointment on the advisor's dashboard and calendar. The process continues to step 562, in which the management system automatically sends a reminder message to the client the day before the scheduled meeting. The process continues to step 564, in which a test is made to determine whether the advisor held the scheduled meeting with the client. In the event that the scheduled meeting was not held, the process continues to IV. Client Review Stalls. The process continues to step 566, in which the advisor utilizes a predefined template to document the meeting. The process continues to step 568, in which the meeting note is integrated into the management system associated with the client. The process continues to step 570, in which the management system alerts the advisor support coordinator that meeting information has been received. The process continues to step 572, in which the account support coordinator analyzes the meeting information and processes the advisor's directives. The process continues to step 574, in which a test is made to determine whether the advisor made a sale. If no sale was made, the process continues to step 576. Otherwise, the process continues to step 578.

In step 576, a test is made to determine whether an additional appointment was scheduled. If an additional appointment was scheduled, the process returns to step 560, in which the management system displays the appointment on the advisor's dashboard and calendar. Otherwise, the process ends.

In step 578, in the event the advisor made a sale, the management system automatically sends a thank you message based on the advisor's predefined preferences. The process continues to step 580, in which it ends.

The section IV. Client Review Stalls is entered from either section II. Client Classification or section III. Client Review Process and flows into step 590, in which it is determined that the client is unresponsive due the expiration of a time period in which we received no answer from them. The process flows to step 592, in which the system updates the category of the client to "stalled". The process continues to step 594, in which the advisor support coordinator reviews the stalls on the dashboard with the advisor in a regularly scheduled meeting. The process continues to step 596, in which a determination is made by the advisor on whether to continue calling. If the advisor wants to continue calling, the process continues to step 506 under the II. Client Classification section. Otherwise, the process continues to step 598, in which the management system updates the category of the client to sales process stopped. The process continues to step 599, in which it ends.

In one example of a client review stall or sales pipeline management stall, during the regular scheduled meeting, the management system 100 flags items that need attention without the need for the account manager (or ASC's) attention.

Referrals

The management system 100 includes a proprietary referral tracking system that allows advisors to keep track of all new referrals they have received and from whom, show the status of all their referrals, and report on the outcome of winning them as a new client. In addition, based on referral information fed to their dashboards, account managers (or ASC's) alert advisors about new referrals during the weekly sync meeting where advisors can decide to add them to a campaign and have the account manager (or AM) call to schedule an appointment.

Opportunity Management/Cross-Selling

The management system 100 contains advanced functionality that allows advisors to log and track new selling opportunities. Directive-based dashboards are programmed to check all open opportunities in the system and display them at the appropriate time to the advisor. In addition, based on opportunity information fed to their dashboards, account managers (or ASC's) alert advisors about opportunities during the weekly sync meeting where advisors can decide to add them to a campaign and have the account manager (or AM) call to schedule an appointment.

Task Management

Task Management/Client Service Tracking—the management system 100 uses an advanced task tracking system that allows C4L staff, the advisor, and local assistant(s) to create and manage tasks. Once due, tasks are displayed on the user's respective directive-based dashboard.

Practice Management Support

Advisors memorialize meetings, assign tasks to team members, and communicate various data points tracked and utilized by the management system (together called "Advisor Updates") via at least one of audio information, short messaging service (SMS) information, email information, and user input, which is prompted through a user interface utilizing a pre-defined template to document the meeting into the record in the database 100. The advisor's assigned account manager (or ASC) is alerted by the management system that new info has been received for processing.

Workflow Wizard

Account managers (or ASC's) utilize a proprietary, advanced workflow wizard to work as a simple on-screen guide to process Advisor Updates. The wizard then analyzes the information and automatically creates tasks and opportunities, moves campaign members to the next relevant campaign track, queues up the system to send emails to clients and prospects, schedules meetings, and updates last contact dates.

All this information is then automatically sent to the advisor and local assistant(s) via application program interface (API) using Salesforce where they can see it, access it immediately on their real-time dashboards, and take action accordingly.

Weekly Sync Meeting

The account managers (or ASC's) use advanced dashboards created and maintained by the C4L system that are coded to continuously check all records in the system and evaluate the status of those records.

Using dozens of different variables and formulas, ASC dashboards analyze if a campaign member is stalled in a campaign, if a client is due for a client review or checkup call, and if opportunities are due or coming due.

These dashboards provide ASC's with functions as part of the present invention to quickly move contacts through a campaign, record notes, and add new records to campaigns, all while meeting real time with advisors.

Data Record Information

The following is an example of a database record for a client or potential buyer.

| Client Information | Other Data Points |
|---|---|
| Primary Address | Relevant Client Notes |
| Primary Phone Number(s) | Open Tasks |
| Primary Email(s) | Calendar Events |
| Do Not Call/Email Designation | Future Client Opportunities |
| Client Attribute (e.g. Client, Prospect, Lead) | |
| Employer/Occupation | |
| Household Tier Rating (for book segmentation) | |
| Spouse Name | |
| Marital Status | |
| Last Contact Date | |
| Last Review Date | |

Fields

The following is an example of fields for a client or potential buyer.

Figure 7B:
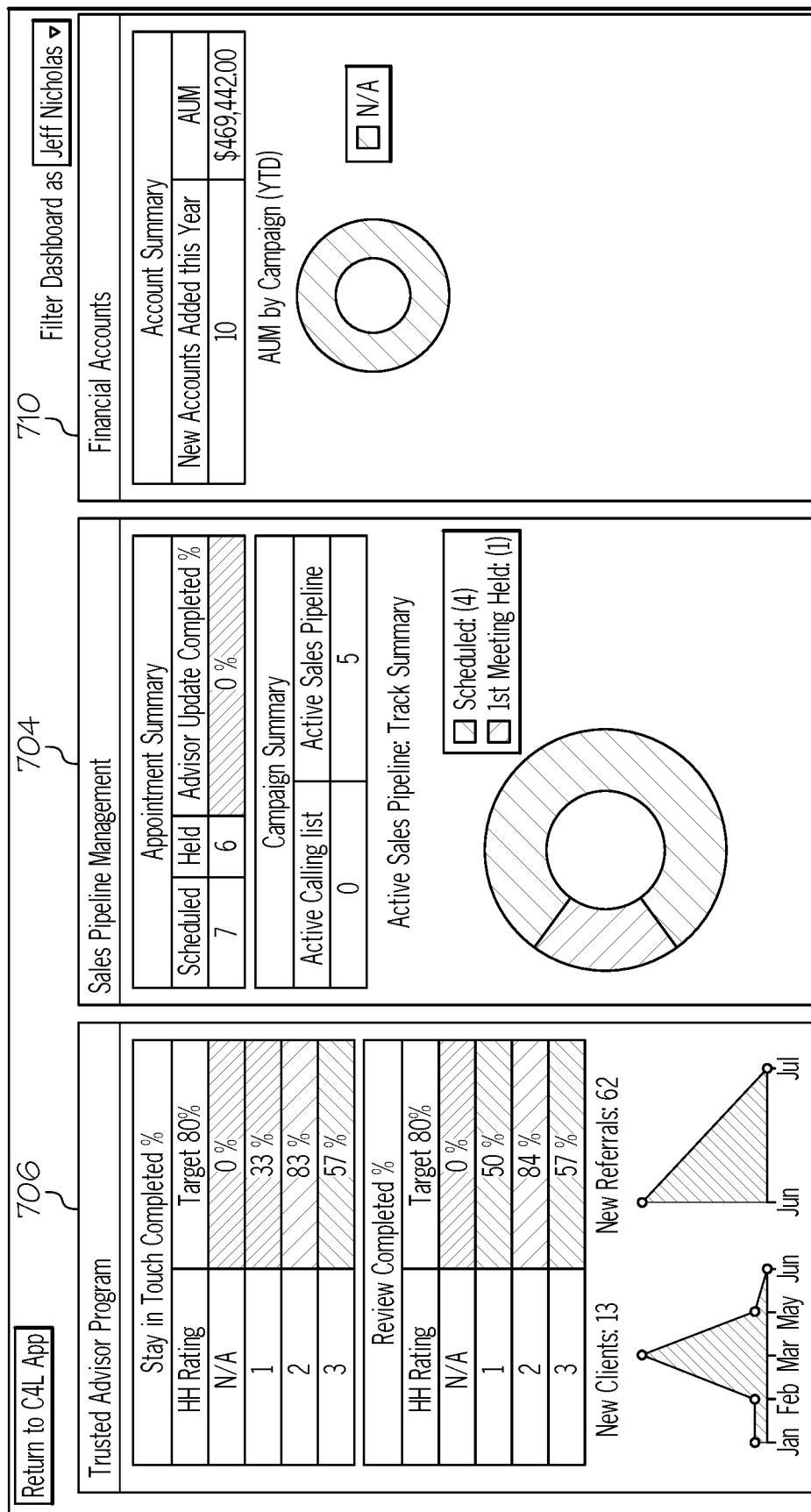

Contact Information
Name
Nickname
Middle Name
Gender
Birthdate
Age
Client Attribute
Relationship in the Household
Decision Maker
Household Name
Owner Name
Secondary Owner Name
Previous Advisor
Marital Status
Spouse
Wedding Anniversary
Important Information
Phone, Email, Fax
Do Not Call
Primary Phone
Mobile
Home Phone Work Phone
Other Phone
Email Opt Out
Primary Email is
Work Email
Personal Email
Other Email
Address Info
Mailing Address
Physical Address
Campaign Info
Category
Assigned Priority
No Interest Reason
Purge Reason
Stalled Notes
Needs to be Assigned?
On Hold Reason
Campaign Eligible?
AM Stalled Details
Stalled Details
Call Attempt Status
Call Back Countdown Timer
Time of Day
Additional Call Details
Requested Info Details
Next Meeting Date
Meeting Location
Meeting Purpose
Meeting Comments
AM Last Dial Date
AM Notes
ASC Notes
AM Call Frequency
Requested Info Date
Communication Profile
Best Time to Call
Opted Out of Morning Calls
Opted Out of Afternoon Calls
Opted Out of Evening Calls
Last Meeting Date
Last Contact Date
Last Checkup Call Date
Next Checkup Call Date
Last Client Review Date
Next Client Review Date
Last Date Offered Review
Last Campaign Activity Date
Time Period Expiring (Campaigns)
Time Period Expiring Combined With No Other Contacts (Checkup Calls)
Active Campaign Member
Campaign Setup Variables
Contact Variables
AM Call Frequency # of Days
Number of Contact Attempts
Best Time of Day to Call (2-1-1)
Opted Out Times of Day
Use Formal or Informal Salutation
Campaign Call Details
Script Variables
Script Type
Client
Prospect
Lead
Pre-Qualified
Campaign Offer
Targeted/Known Interest Offer
Generic Offer
Combination of Targeted and Generic Offers
Contact Info
Advisor Contact Information
Campaign Language
Introduction Language
Leave Message Language
Advisor Services Language
Meeting Variables
Appointment Advance Preparation Time
Preparation Time Between Appointments
Standard Appointment Duration Time
Preferred Meeting Location (In Office, Out of Office, Telephone)
Communication Variables
Messaging Content
Initial Campaign Message
Unanswered Call Attempts
Purge
Meeting Thank You
Trusted Advisor Program Variables
Household Tier Rating (1, 2, 3)
Checkup Call Interval
Client Review Interval
Etiquette Messaging Method
Trusted Advisor Override Options
Do Not Call for Checkup Call
Do Not Call for Client Review
Tiers to Call for Checkup Calls
Book Segmentation Assignment
Checkup Call Priority
Checkup Call Override Options
Misc.
Auto-Add?
How Many Names to Automatically Add to a Campaign
Advisor's Dashboard FIG. 7A to FIG. 7B are screen shots of the advisor's directive-based and programs results dashboards of the management system. In FIG. 7A, shown are three areas Practice Management 702, Sales Pipeline Management 704, and Trusted Advisor Program 706. Under each of these three areas: 702, 704, 706 are various statuses and alerts. For example, under the Practice Management area 702, are "Tasks to Complete", "Potential RMDs" (Required Minimum Distribution for some retirement accounts e.g. IRA, SEP IRA, Simple IRA, etc.), "Qualifying Events", "Accounts Out of Surrender" and "Pending Accounts". Under the Sales Pipeline Management area 704, are "Appointment Preparation to Complete", "Advisor Updates to Complete", "Campaign Stalls—Unable to Call", and "Opportunities Due". Under the Trusted Advisor Program area 706, are "Email Campaigns to Send", "Birthday Letters to Print", "Birthday Emails to Send", "Anniversary Letters to Print", "Anniversary Emails to Send", "Client Reviews Due", Checkup Calls Due", "Clients Missing Birthdate", "Clients Missing Wedding Anniversary", and "Clients Missing Email".

FIG. 7B is an example graphical dashboard with graphical widgets in two of the three areas shown in FIG. 7A of Sales Pipeline Management 704 and Trusted Advisor Program 706, with an additional area of Financial Accounts. The information on the dashboard shown in FIG. 7A and FIG. 7B are updated in real-time on the management platform.

Figure 8C:

FIG. 8A to FIG. 8D are screen shots of the advisor's dashboards of the management system meant to illustrate various customizations, filters, and features for efficiency in utilizing the dashboards. Shown in FIG. 8A are filters, customizations and features that the user can select to change view settings. For example, the number of records 802 can be selected, the date range for client reviews due 804, the ability to export to Excel 806, the ability to click on the client reviews due 808 link to display at the bottom of the screen to work from (rather than opening a new tab), and which range of records to view 810.

FIG. 8B depicts that the dashboard is filterable by role 820, that you can click on a link such as "Birthday Emails to Send" to display at the bottom of the screen to work from (rather than opening a new tab) 822, that you can select a date range to filter the results by 824, and that there are a variety of different options directly from the screen, such as saving edits made and exporting information to Excel 826.

Figure 8D:
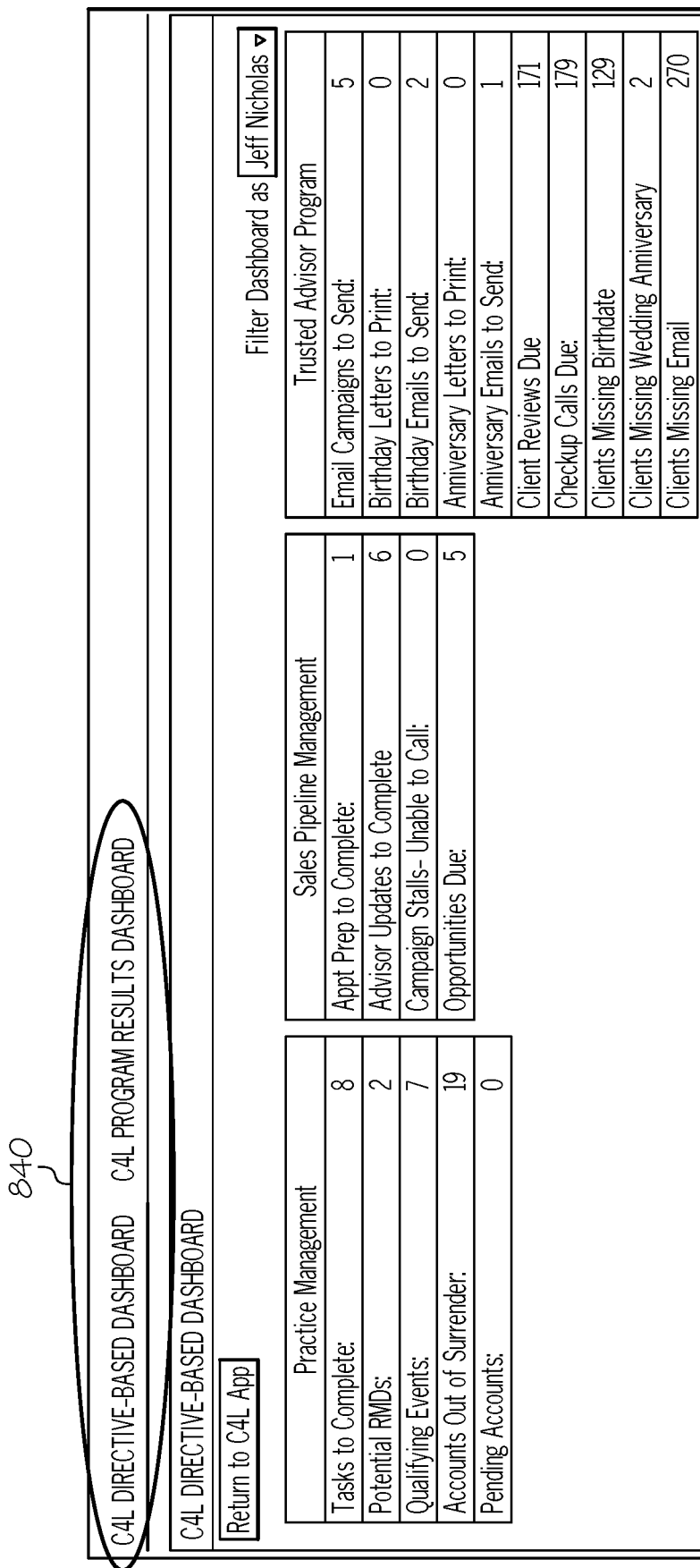

FIG. 8C depicts that fields 830, such as Phone Number are editable without leaving the screen. FIG. 8D depicts the ability to switch back and forth between the directive-based dashboard and the program results dashboard 840.

Customized, Integrated Scripts for Account Manager

FIG. 9A to FIG. 9F are screen shots of how the customized scripts are integrated into the management system for utilization by the account manager (or AM). FIG. 9A and FIG. 9B shows two portions of the screen. FIG. 9A is a left side 902 with the information about the potential buyer or client, special calling and scheduling instructions, links to various places for efficiency purposes, and information about the advisor and their office, and a right side 904 shown in FIG. 9B with a script that is dynamically populated based on the advisor's preferences, campaign setup variables, and the information on the left side. FIG. 9C is an example of the offer section of the script as part of the Sales Pipeline management function, showing how the account manager is guided to place a response under "Interested in Offer?". In this case, the recorded response is "Yes". The script automatically, based on the "Yes" answer, guides the account manager to ask more qualifying questions as shown in FIG. 9D. Again, it is important to note that the system requires that the account manager document or record the potential buyer's/client's answers. In this example, the potential buyer's answer to "Able to Visit Now?" is "Yes". Upon a "No" answer FIG. 9E, the script automatically guides the account manager to ask a follow-up question regarding staying on communication in FIG. 9F before ultimately classifying them as "Not Interested".

Script Flow

FIG. 10A to FIG. 10D is an example script flow used by the account manager as presented by the management system. These scripts correspond to the FIG. 9A through FIG. 9F. It is important to note that the fields denoted as "<< >>" are variable and change depending on a combination of data from the advisor's contact information, preferences, and the potential buyer's/client's information. These data fields are described above.

Markup Language

FIG. 11 is a code fragment of the markup language used to implement the customized, integrated scripts shown in FIG. 9A through FIG. 9F and of the script flow FIG. 10A to FIG. 10D.

Interactive Voice Response (IVR) System

Figure 12:
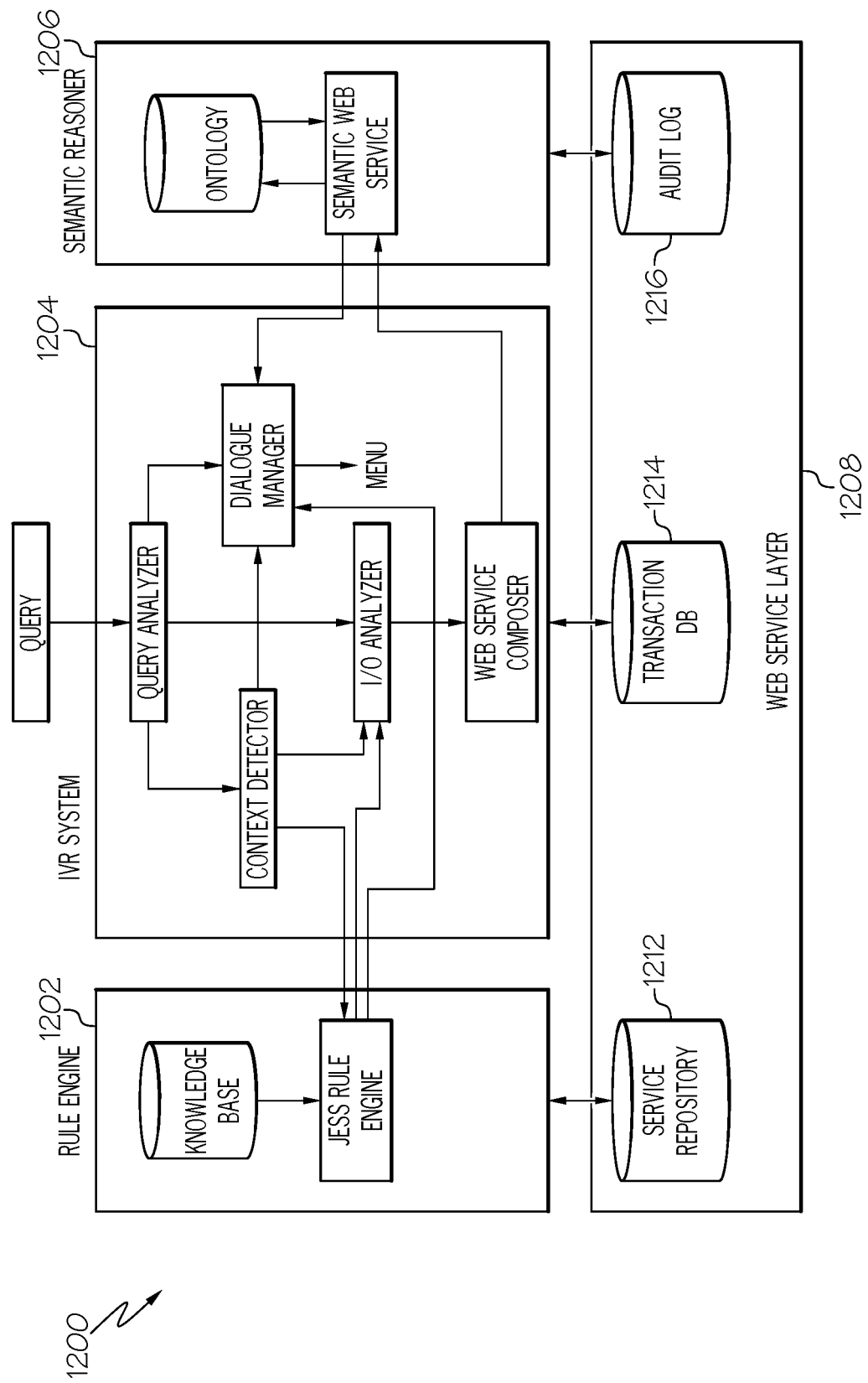
FIG. 12 is an example hardware implementation of interactive voice response system and machine learning.

FIG. 12 is an example hardware implementation 1200 of interactive voice response system and machine learning. Initially, when an advisor or user enters into IVR system 1204, a set of default menus will be presented to them. Then, the system gets the request from the user and finds whether the request is deterministic or non-deterministic. After user picking up the options, Query analyzer structures the needs of the user based on the query inputted by the user and the context detector recognizes the user context that is IVR sequence, request id, and request time, meaning how often does the user use the same option. The output of the query analyzers is inputted to the I/O analyzer for evaluating I/O requirement of the system for the particular operation.

Rule Engine 1202

The responsibility of the rule engine is to analyze the order of dialogue flow from the result of the context detector. From the knowledge base system, the Java Expert System (JESS) decides in which flow the dialogue should appear. Whenever the user interacts with the system, the knowledge base collects information about user behaviors and the knowledge keeps on updating. Based on the need of user requirement, the required rule is fetched from the JESS rule set and then it is extracted. If the rule does not available in JESS ruleset then the new rule will be created from the knowledge base. The dialogue manager creates dynamic menu based on the response from previous states and the user context when the system reached the user needs otherwise service composition will be performed from the available set of service.

Semantic Reasoner 1206

The system not aware of how to progress the request or lack of knowledge about the request those are non-deterministic request which refer the semantic reasoner. It determines the I/O parameter with the support of the I/O analyzer. The web service composer fetched out the details for composing service from the ontology. If the service is subset of ontograph's vertex and edges then the service is mapped out to the ontograph or the service is bound with to the input and output parameter and then the required service is extracted and executed.

Web Service Layer 1208

Service repository 1212 is the storage of all the services. Two main task done by the service repository, one is based on the user request the service is taken out from the service registry, another is the new composition service will be created from the service repository and the composed service also stored in service repository. All sort of transactions done by the user is stored in the transaction database 1214. Audit log 1216 records the details about the option chosen by the user in the IVR system and session details of the user.

Management System Operating Environment

Figure 13:
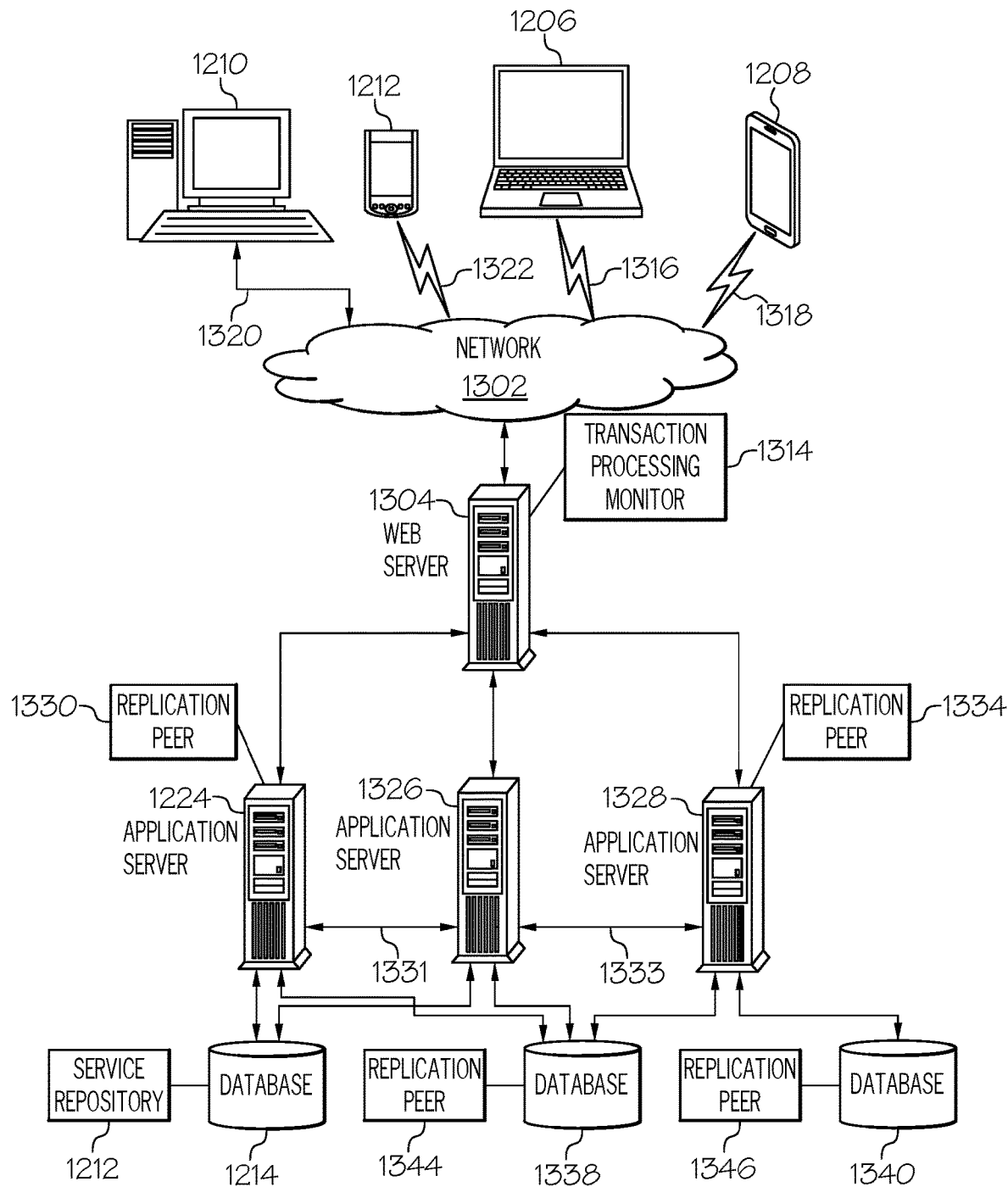
FIG. 13 is the n-tier architecture upon which flow diagrams of FIG. 4 through FIG. 6 and the dashboards can operate.

FIG. 13 is the n-tier architecture upon which flow diagrams of FIG. 4 through FIG. 6 and the dashboards can operate. It should be noted that although the following discussion is directed to a cloud computing environment various embodiment are not limited to such environment and are application to non-cloud computing environments as well.

It is important to note that although only a 3-tier architecture is shown, those of average skill in the computing arts will appreciate that this architecture can be easily extended to four or more tiers as in a multi-tier or n-tier system.

Management System Operating Environment

FIG. 13 is the n-tier architecture upon which flow diagrams of FIG. 4 through FIG. 6 and the dashboards can operate. It should be noted that although the following discussion is directed to a cloud computing environment various embodiment are not limited to such environment and are application to non-cloud computing environments as well.

It is important to note that although only a 3-tier architecture is shown, those of average skill in the computing arts will appreciate that this architecture can be easily extended to four or more tiers as in a multi-tier or n-tier system.

Referring to FIG. 13 shown is a multi-tier system architecture with a tier of clients 1310, 1312, 1306, 1308, a tier of application servers 1324, 1326, 1328, and a tier of non-volatile storage in databases 1338, 1340. This multi-tier client/server architecture improves performance and flexibility for systems with a large number of users. Flexibility in partitioning can be as simple as "dragging and dropping" application code modules onto different computers in some multi-tier architectures.

This multi-tiered system has evolved from a more conventional system architecture in which clients retrieve information from a database, process the data according to instructions from a user, and store the data in the database. The clients in the conventional system architecture have three types of computer instructions installed and running on them to process information: code for the user interface (displaying buttons and lists of data), code for interacting with the database to fetch or store data, and code that processes the fetched data according to commands from the user interface or business logic. In contrast, in the multi-tiered system architecture, the client may contain only user interface code. The code for interacting with the database and processing the data is installed and operating on a middle-tier of servers such as application servers of FIG. 13. The middle tier of servers interacts with the database and processes data on behalf of the client. The multi-tiered system of architecture therefore has these advantages: the forced separation of user interface and business logic, a low bandwidth requirement for the network, and the concentration of business logic code in a few machines—rather than inserting business logic into all application software on all of thousands or millions of clients.

There are a variety of ways of implementing this middle tier, such as transaction processing monitors, message servers, or application servers. The middle tier can perform queuing, application execution, and database staging. For example, if the middle tier provides queuing, the client can deliver its request to the middle layer and disengage because the middle tier will access the data and return the answer to the client. In addition, the middle tier adds scheduling and prioritization for work in progress.

The exemplary web server 1304 of FIG. 13 also has installed and operating on it a transaction processing monitor (TPM) 1314. The TP monitor technology is a type of message queuing, transaction scheduling, and prioritization service where the client connects to the TP monitor (middle tier) instead of the database server. The transaction is accepted by the monitor, which queues it and then takes responsibility for managing it to completion, thus freeing up the client. The TPM 1314 provides applications' services to many clients by multiplexing client transaction requests onto a controlled number of processing routines that support particular services.

The system of FIG. 13 includes several exemplary clients 1310, 1312, 1306, 1308. A client is a computer or a process or thread running on a computer that requests resources or services from another computer. Exemplary clients of FIG. 13 include: a personal computer 1310 coupled to the network 1302 through a wireline connection 1320, a personal digital assistant (PDA) 1312 coupled to the network 1302 through a wireless connection 1322, a laptop computer 1306 coupled to the network 1302 through a wireless connection 1316, and a mobile telephone 1308 which is coupled to the network 1302 through a wireless connection 1318.

The system of FIG. 13 includes a data communications network 1302 which provides for data communications among clients 1310, 1312, 1306, 1308 and web server 1304. A network is a group of computers coupled for data communications according to data communications protocols through other computers typically referred to as routers, bridges, or switches. (The routers, bridges, and switches are not shown on FIG. 13.

The system of FIG. 13 includes web server 1304. A server is a computer or a process or thread running on a computer that receives, processes, and responds to requests for resources or services from another computer. A web server is a server that carries out data communication according to a hyperlinking protocol. A common example of a hyperlinking protocol is the HyperText Transfer Protocol, the foundation of the World Wide Web. The term 'web server' is used in this specification more broadly, however, to refer to any server that support any hyperlinking protocol, including, for example, the Wireless Access Protocol (WAP), the Handheld Device Transport Protocol (HDTP), and others as will occur to those of skill in the art. The web server 1304 provides static web pages in responses to clients as well as dynamic web pages in such formats as Java Server Pages (JSP), PHP Hypertext Processor (PHP) pages, Microsoft's Active Server Pages (ASP), and Common Gateway Interface (CGI) scripts, and others as will occur to those of skill in the art.

Some caution is advised in use of the terms 'client' and 'server' because whether a particular computer acts as a client or a server depends upon role. In the system of FIG. 13, for example, when web server 1314 receives from personal computer 1310 a request for a web page, web server 1304 is acting as a server; when, however, web server 1304 requests resources from application server 1324 in order to fulfill the request from personal computer 1310, web server 1304 acts as a client.

The system of FIG. 13 also includes application servers 1324, 1326, 1328 coupled for data communications to web server 1304. The application servers 1324, 1326, 1328 are also connected to databases 1338, 1340 and to each other 1331, 1333. The system of FIG. 13 also includes non-volatile storage in the form of databases 1338, 1340. The application servers 1324, 1326, 1328 and the databases 1338,1340 have installed and operating on them replication peers 1330, 1334, 1344, 1346. A peer is a computer or a process or thread running on a computer that has the same capabilities of requesting and responding to requests as other computers similarly situated in a network. A replication peer is a software module that stores on a replication medium sessions flushed from a replication queue. A replication peer 1344, 1346 may store a session from an application server 1324, 1326, 1328 to non-volatile storage in a database 1338, 1340. A replication peer 1330, 1334 also may store 1331, 1333 a session from an application server 1324, 1326, 1328 into remote random-access memory on another application server.

The arrangement of servers and other devices making up the exemplary system illustrated in FIG. 13 are for explanation, not for limitation. Data processing systems useful according to various embodiments of the present invention may include additional servers, routers, other devices, and peer-to-peer architectures, not shown in FIG. 13, as will occur to those of skill in the art. Networks in such data processing systems may be implemented as local area networks (LANs), wide area networks (WANs), intranets, internets, and others as will occur to those of skill in the art.

Networks in such data processing systems may support many data communications protocols, including, for example, the Transmission Control Protocol (TCP), the Internet Protocol (IP), the HyperText Transfer Protocol (HTTP), the Wireless Access Protocol (WAP), the Handheld Device Transport Protocol (HDTP), and others as will occur to those of skill in the art. Various embodiments of the present invention may be implemented on a variety of hardware platforms in addition to those illustrated in FIG. 13.

Example System/Server

Figure 14:
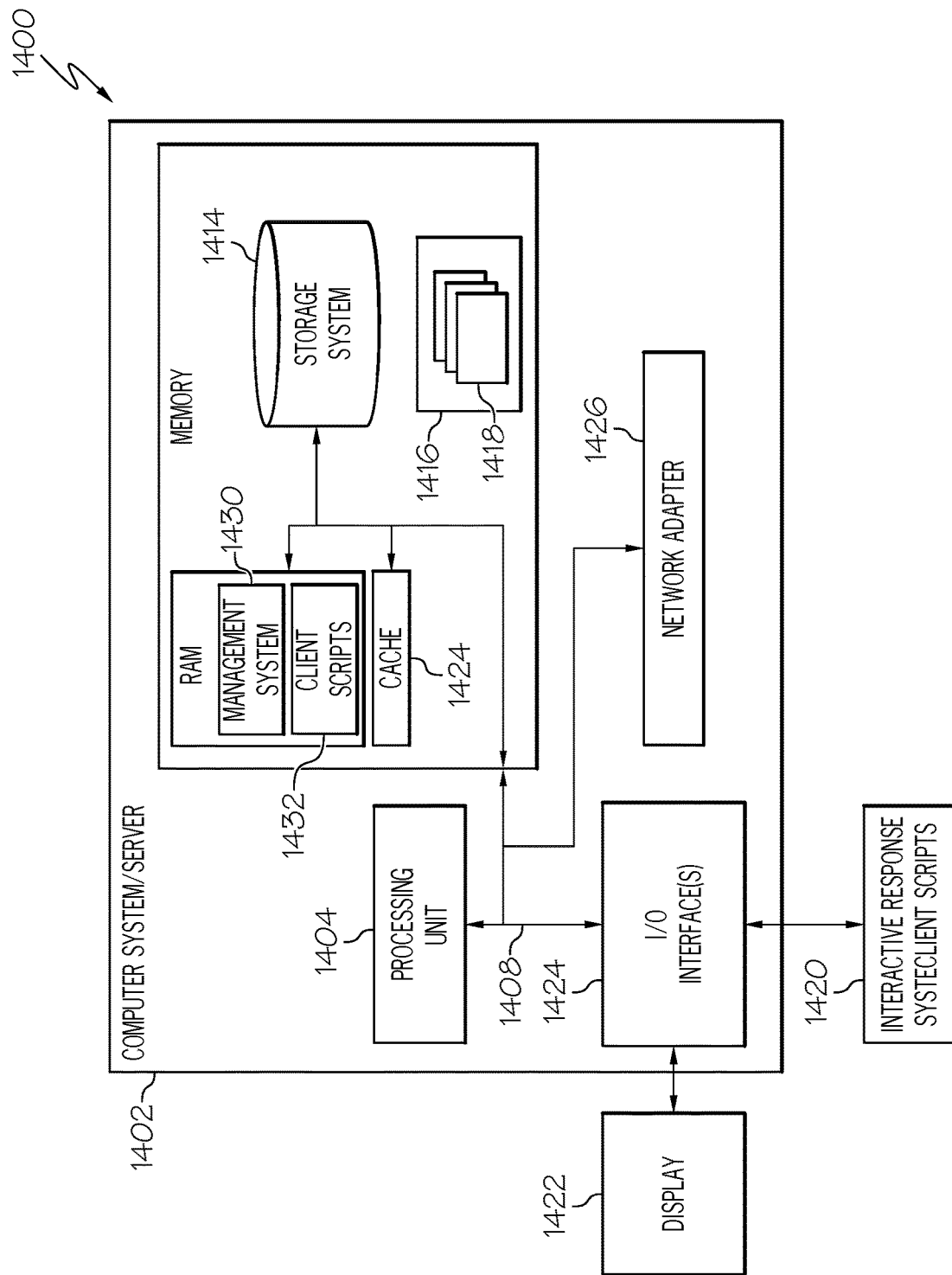
FIG. 14 is a block diagram of a computer system useful for implementing the software steps of the present invention.

FIG. 14 is a block diagram of a computer system useful for implementing the software steps of the present invention upon which flow diagrams of FIG. 4 through FIG. 6 can operate. FIG. 14 illustrates one example of a processing node and is not intended to suggest any limitation as to the scope of use or functionality of embodiments of the invention described herein. Regardless, the computing node 1400 is capable of being implemented and/or performing any of the functionality set forth hereinabove.

Referring now to FIG. 14, this figure is a block diagram 1400 illustrating an information processing system that can be utilized in embodiments of the present invention. The components of the information processing system 1402 can include, but are not limited to, one or more processors or processing units 1404, a system memory 1406, and a bus 1408 that couples various system components including the system memory 1406 to the processor 1404. The system memory 1406 can include the computer code for the flight path processor 1430 as well as the lift data table 1432 of FIG. 8.

The bus 1408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The information processing system 1402 can further include other removable/non-removable, volatile/non-volatile computer system storage media. By way of example only, a storage system 1414 can be provided for reading from and writing to a non-remov6able or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1408 by one or more data media interfaces. The memory 1406 can include at least one program product having a set of program modules that are configured to carry out the functions of an embodiment of the present invention.

Program/utility 1416, having a set of program modules 1418, may be stored in memory 1406 by way of example, and not limitation, as well as an operating system, one or more application programs, other program modules, and program data. Each of the operating system, one or more application programs, other program modules, and program data or some combination thereof, may include an implementation of a networking environment. Program modules 1418 generally carry out the functions and/or methodologies of embodiments of the present invention.

The information processing system 1402 can also communicate with one or more external devices 1420 such as a keyboard, a pointing device, a display 1422, etc.; one or more devices that enable a user to interact with the information processing system 1402; and/or any devices (e.g., network card, modem, etc.) that enable computer system/server 1402 to communicate with one or more other computing devices. Such communication can occur via I/O interfaces 1424. Still yet, the information processing system 1402 can communicate with one or more networks such as a local area network (LAN), a general wide area network (WAN), and/or a public network (e.g., the Internet) via network adapter 1426. As depicted, the network adapter 1426 communicates with the other components of information processing system 1402 via the bus 1408. Other hardware and/or software components can also be used in conjunction with the information processing system 1402. Examples include, but are not limited to: microcode, device drivers, redundant processing units, external disk drive arrays, RAID systems, tape drives, and data archival storage systems.

Non-Limiting Examples

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-based method of managing multiple parties in a client relationship process, the computer-based method comprising:

based on one or more time periods expiring combined with no other contacts to a third party having been made by either a first party or a second party, and the third party is not part of an active sales campaign governed by the first party, retrieving from a record from a database at least a script as part based on a combination of a client relationship campaign of a first party and at least one of three predefined tiers of a third party, for use during a follow-up communication carried out by a second party with a third party, and in which each of the first party, the second party and the third party are different parties, the record in the database including the client attribute indicating whether the third party is a contact with no previous relationship with the first party, a contact with a current relationship with the first party but has not yet purchased a good or a service from the first party, or a client;

storing answers received from the third party by the second party during the follow-up communications, using a hierarchical tree structure that summarizes answers in a predefined format, into the record in the database associated with the third party, wherein the hierarchical tree structure includes a plurality of branch nodes, each branch node linked directly by paths to a parent node and at least one child node, and whereby an answer received at a branch node defines a path to a child node; and triggering, based on the script, at least one of follow-up alerts and follow-up actions; and presenting in real-time on a graphical user interface, the answers about the third party received by the second party using the predefined format in the database, along with the at least one of follow-up alert and follow-up actions, as part of a dashboard displayed to the first party, the dashboard further including a summary of contacts complete, where the color of the contacts complete are presented in one of three colors depending on a percentage complete.

2. The computer-based method of claim 1, wherein the calling of the third party by the second party is based on the third party being categorized into one of the three predefined tiers.

3. The computer-based method of claim 1, wherein the one or more time periods expiring is a checkup call interval.

4. The computer-based method of claim 1, wherein the calling of the third party by the second party is based on the third party being categorized into one of the three predefined tiers.

5. The computer-based method of claim 1, further comprising:

calling the third party by the first party based on the third party being categorized into another one of the three predefined tiers.

6. The computer-based method of claim 1, further comprising:

storing preferences provided by the first party for the client relationship campaign, the preferences include script variables, contact variables, and meeting variables.

7. The computer-based method of claim 6, further comprising:

storing preferences provided by the first party for the client relationship campaign, the preferences include a number of days required to prepare for a meeting with the third party, preparation time required between each meeting, duration of the meeting, and preferred location of the meeting.

8. The computer-based method of claim 6, further comprising:

storing preferences provided by the first party for the client relationship campaign, the preferences include a frequency of call attempts, a number of days in between contact attempts, and four telephone call attempts to be scheduled as a default as two separate telephone calls during different afternoon time periods, one call in a morning time period, and one call in an evening time period.

9. The computer-based method of claim 6, further comprising:

storing preferences provided by the first party for the client relationship campaign, the preferences include the type of script associated with the corresponding client attribute indicating whether the third party is a contact with no previous relationship with the first party, a contact with a current relationship with the first party but has not yet purchased a good or a service from the first party, or a client, the offer of the client relationship campaign, the first party's contact information, and specific language to be used in the script, with the possibility of removing certain questions.

10. The computer-based method of claim 1, wherein the script is encoded using a markup language.

11. The computer-based method of claim 1, further comprising:

retrieving from the database a series of records for a group of all third parties including the third party that are part of a client relationship process;

presenting a plurality of graphical user interface widgets indicating at least one of follow-up alerts, follow-up actions, and status of the client relationship process for the group of all third parties.

12. The computer-based method of claim 1, wherein the script includes contents for recording a voice mail left at a telephone number of the third party, the contents are based on the preferences set by the first party.

13. The computer-based method of claim 12, wherein the voice mail is generated using text-to-speech.

14. A system for multiple parties in a client relationship process, the system comprising:

a computer memory capable of storing machine instructions; and a hardware processor in communication with the computer memory, the hardware processor configured to access the computer memory, the hardware processor performing based on one or more time periods expiring combined with no other contacts to a third party having been made by either a first party or a second party, and the third party is not part of an active sales campaign governed by the first party, retrieving from a record from a database at least a script as part based on a combination of a client relationship campaign of a first party and at least one of three predefined tiers of a third party, for use during a follow-up communication carried out by a second party with a third party, and in which each of the first party, the second party and the third party are different parties, the record in the database including the client attribute indicating whether the third party is a contact with no previous relationship with the first party, a contact with a current relationship with the first party but has not yet purchased a good or a service from the first party, or a client;

storing answers received from the third party by the second party during the follow-up communications, using a hierarchical tree structure that summarizes answers in a predefined format, into the record in the database associated with the third party, wherein the hierarchical tree structure includes a plurality of branch nodes, each branch node linked directly by paths to a parent node and at least one child node, and whereby an answer received at a branch node defines a path to a child node; and triggering, based on the script, at least one of follow-up alerts, and follow-up actions; and presenting in real-time on a graphical user interface, the answers about the third party received by the second party using the predefined format in the database, along with the at least one of follow-up alert and follow-up actions, as part of a dashboard displayed to the first party, the dashboard further including a summary of contacts complete, where the color of the contacts complete are presented in one of three colors depending on a percentage complete.

15. The system of claim 14, wherein the calling of the third party by the second party is based on the third party being categorized into one of the three predefined tiers.

16. The system of claim 14, wherein the one or more time periods expiring is a checkup call interval.

17. The system of claim 14, wherein the calling of the third party by the second party is based on the third party being categorized into one of the three predefined tiers.

18. The system of claim 14, further comprising:
calling the third party by the first party based on the third party being categorized into another one of the three predefined tiers.

19. A non-transitory computer program product tangibly embodying computer readable instructions which, when implemented, cause a computer to carry out the steps of a method for managing multiple parties in a client relationship process on a storage media, comprising:
based on one or more time periods expiring combined with no other contacts to a third party having been made by either a first party or a second party, and the third party is not part of an active sales campaign governed by the first party, retrieving from a record from a database at least a script as part based on a combination of a client relationship campaign of a first party and at least one of three predefined tiers of a third party, for use during a follow-up communication carried out by a second party with a third party, and in which each of the first party, the second party and the third party are different parties, the record in the database including the client attribute indicating whether the third party is a contact with no previous relationship with the first party, a contact with a current relationship with the first party but has not yet purchased a good or a service from the first party, or a client;
storing answers received from the third party by the second party during the follow-up communications, using a hierarchical tree structure that summarizes answers in a predefined format, into the record in the database associated with the third party, wherein the hierarchical tree structure includes a plurality of branch nodes, each branch node linked directly by paths to a parent node and at least one child node, and whereby an answer received at a branch node defines a path to a child node; and
triggering, based on the script, at least one of follow-up alerts, and follow-up actions; and
presenting in real-time on a graphical user interface, the answers about the third party received by the second party using the predefined format in the database, along with the at least one of follow-up alert and follow-up actions, as part of a dashboard displayed to the first party, the dashboard further including a summary of contacts complete, where the color of the contacts complete are presented in one of three colors depending on a percentage complete.

20. The non-transitory computer program product of claim 19, wherein the calling of the third party by the second party is based on the third party being categorized into one of the three predefined tiers.

* * * * *